US012670219B2

(12) United States Patent
Nadar et al.

(10) Patent No.: US 12,670,219 B2
(45) Date of Patent: Jun. 30, 2026

(54) PROFILING AND COMPARISON OF DATA

(71) Applicant: FMR LLC, Boston, MA (US)

(72) Inventors: Suresh Kumar Nadar, Maharashtra (IN); Sunny Aryan, Karnataka (IN); Abhinav Kumar Sinha, Bihar (IN); Sebastian Sundar, Karnataka (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/984,976

(22) Filed: Dec. 17, 2024

(65) Prior Publication Data

US 2026/0170062 A1 Jun. 18, 2026

(51) Int. Cl.
*G06F 16/903* (2019.01)
*G06F 16/22* (2019.01)
(52) U.S. Cl.
CPC ...... *G06F 16/90344* (2019.01); *G06F 16/221* (2019.01)
(58) Field of Classification Search
CPC .......................... G06F 16/90344; G06F 16/221
See application file for complete search history.

(56) References Cited

U.S. PATENT DOCUMENTS

| | | | |
|---|---|---|---|
| 12,229,129 B1* | 2/2025 | Kappler | G06F 16/2468 |
| 12,361,031 B1* | 7/2025 | Balasubramaniam | |
| | | | G06F 16/285 |
| 2017/0193036 A1* | 7/2017 | Yueh | G06F 16/242 |
| 2022/0114190 A1* | 4/2022 | Pattar | G06F 16/2282 |
| 2024/0184793 A1* | 6/2024 | Amulu | G06F 16/2465 |
| 2025/0165561 A1* | 5/2025 | Warner | G06F 18/22 |
| 2025/0200017 A1* | 6/2025 | Rozenberg | G06F 16/221 |
| 2025/0272543 A1* | 8/2025 | Tan | G06N 3/0455 |

* cited by examiner

*Primary Examiner* — Dangelino N Gortayo
(74) *Attorney, Agent, or Firm* — Cesari and McKenna, LLP

(57) ABSTRACT

A computerized method is provided for automated profiling and comparison of electronic data including in different environments and formats. Data column comparison and/or mapping can be efficiently accomplished without input of human experts through a three-step process including column name direct matching, a fuzzy string matching algorithm (token sort ratio) on unmatched columns, and finally a column data comparison for remaining unmatched columns.

18 Claims, 27 Drawing Sheets

203 - comparing column names between a first electronic data table and a second electronic data table 205 - defining columns having 100% column name similarities between the first and second electronic data tables as matches 207 - applying a fuzzy string matching algorithm (token sort ratio) to any unmatched column names from the defining step to produce a similarity score for each pair of unmatched column names between the first and second electronic data tables 209 - classifying columns as matches when the similarity score for the pair of unmatched column names is above a selected threshold 211 - selecting a number of sample records from remaining columns in the first and second electronic data tables not matched in the defining or classifying steps 213 - comparing the sample records from each remaining column in the first electronic data table to the sample records from each remaining column in the second electronic data table to determine a data match score 215 - mapping remaining columns from the first electronic data table as matches to remaining columns from the second electronic data table based on highest data match score

201

203 - comparing column names between a first electronic data table and a second electronic data table 205 - defining columns having 100% column name similarities between the first and second electronic data tables as matches 207 - applying a fuzzy string matching algorithm (token sort ratio) to any unmatched column names from the defining step to produce a similarity score for each pair of unmatched column names between the first and second electronic data tables 209 - classifying columns as matches when the similarity score for the pair of unmatched column names is above a selected threshold 211 - selecting a number of sample records from remaining columns in the first and second electronic data tables not matched in the defining or classifying steps 213 - comparing the sample records from each remaining column in the first electronic data table to the sample records from each remaining column in the second electronic data table to determine a data match score 215 - mapping remaining columns from the first electronic data table as matches to remaining columns from the second electronic data table based on highest data match score

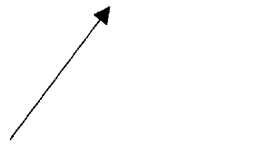

DATA COMPARE WORKFLOW DIAGRAM

PROFILING AND COMPARISON OF DATA

TECHNICAL FIELD

This application relates generally to systems, methods, and apparatuses, including computer program products, for efficient profiling and comparison of data including large databases.

BACKGROUND

In the digital age, companies are collecting, retaining, and accessing more and more data. In various industries, including financial services, that data can be a powerful resource to glean meaningful insights from. However, as the trove of data grows, quickly understanding, summarizing, and comparing data across files and platforms has become daunting and can negatively impact a business's ability to effectively utilize that data.

For example, for data comparison of more than 100 columns, it can take days using conventional technologies to understand the column mapping with different column names. This tedious task is often performed manually by analysts and data engineers and can require input from a subject matter expert. In order to understand not just the general meaning of a table but the business aspect and dynamics thereof, current techniques may require that at least 10 to 15 queries be run with costs associated with each query run. Additionally, in order to compare the data of two different tables, current techniques only compare sample records (e.g., 10 or 100 rows) thereby reducing accuracy of the comparison. To achieve 100 percent record variance or match evaluation for all columns using conventional technologies can take very sophisticated (e.g., expensive and time consuming) queries and significant time.

SUMMARY

Systems and methods of the invention provide an efficient tool for data profiling and comparison along with distinctive visual representations of those profiles and comparisons and additional functions for understanding business insights and the interrelation among different tables. The systems and methods herein advantageously provide applications in the field of data analysis to identify data inconsistencies redundancy; data migration in order to speed up migration through fast but thorough data validation; data quality assessment by aiding in the discovery of data quality issues, risks, and overall trends; predictive decision making by creating an accurate snapshot of a company's health to better inform the decision-making process; and strategic planning as a more comprehensive understanding of company data can permit better market strategies.

Systems and methods of the invention can allow for rapid database column mapping with simplified user input. For example, column mapping for data comparison can be accomplished in a few seconds with only a single click from a user. In many instances, complete data profiling for the table can be performed with minimal user input and within only a few seconds for millions of records, allowing users to understanding a table from a business perspective. Profiling can provide business insights like data value, data character, words, spaces, and special character info all with graphical interpretation. In some embodiments, systems and methods of the invention can provide a row-by-row data comparison for even large, complex tables. This row-by-row data comparison can also be performed within a few seconds, avoiding accuracy concerns with sampling using traditional comparison techniques. Additionally, systems and methods of the invention can allow for record variance and match evaluation to be quickly calculated and reported for all column records.

By efficiently automating data profiling and comparison, systems and methods described herein reduce the man hours required and the need for subject matter experts in order to perform column mapping tasks. Quick, cost-effective, and accurate profiling and comparison further aid in effective data migration and understanding of the true value of the multitude of data at a modern company's disposal.

Aspects of the invention can include a computerized method for electronic data comparison. Methods can include using a column mapping engine for the steps of: 1) comparing column names between a first electronic data table and a second electronic data table; 2) defining columns having 100% column name similarities between the first and second electronic data tables as matches; 3) applying a fuzzy string matching algorithm (token sort ratio) such as the fuzz.token_sort_ratio function to any unmatched column names from the defining step to produce a similarity score for each pair of unmatched column names between the first and second electronic data tables; 4) classifying columns as matches when the similarity score for the pair of unmatched column names is above a selected threshold; 5) selecting a number of sample records from remaining columns in the first and second electronic data tables not matched in the defining or classifying steps; 6) comparing the sample records from each remaining column in the first electronic data table to the sample records from each remaining column in the second electronic data table to determine a data match score; and 7) mapping remaining columns from the first electronic data table as matches to remaining columns from the second electronic data table based on highest data match score.

In various embodiments, methods can further comprise performing, with a data comparison engine, a row-by-row comparison of records between the matched columns in the first and second electronic data tables to determine a match percentage or variance percentage for each of the matched columns. Methods may include generating a report comprising the column names and match or variance percentage for each of the matched columns. The report can further comprise a record match count for each of the matched columns. The report may further comprise a record difference count for each of the matched columns.

In various embodiments, the selected threshold can be 50% similarity, 60% similarity, 70% similarity, or more. In some embodiments, the number of sample records may be 500 or more. In certain embodiments, the number of sample records can be 1000 or more.

In certain aspects, systems of the invention can include a computer system for electronic data comparison, the system comprising a processor in communication with a non-transient memory and operable to use a column mapping engine to perform the steps of: 1) comparing column names between a first electronic data table and a second electronic data table; 2) defining columns having 100% column name similarities between the first and second electronic data tables as matches; 3) applying a fuzzy string matching algorithm (token sort ratio) such as the fuzz.token_sort_ratio function to any unmatched column names from the defining step to produce a similarity score for each pair of unmatched column names between the first and second electronic data tables; 4) classifying columns as matches when the similarity score for the pair of unmatched column names is above a selected threshold; 5) selecting a number of sample records from remaining columns in the first and second electronic data tables not matched in the defining or classifying steps; 6) comparing the sample records from each remaining column in the first electronic data table to the sample records from each remaining column in the second electronic data table to determine a data match score; and 7) mapping remaining columns from the first electronic data table as matches to remaining columns from the second electronic data table based on highest data match score.

In various embodiments systems of the invention can be operable to perform any and all of the aforementioned methods.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 shows an exemplary method for electronic data comparison.

FIG. 16 shows an exemplary user interface displaying a column value report.

FIG. 17 shows an exemplary user interface displaying column value information for a selected column.

DETAILED DESCRIPTION

Figure 1:
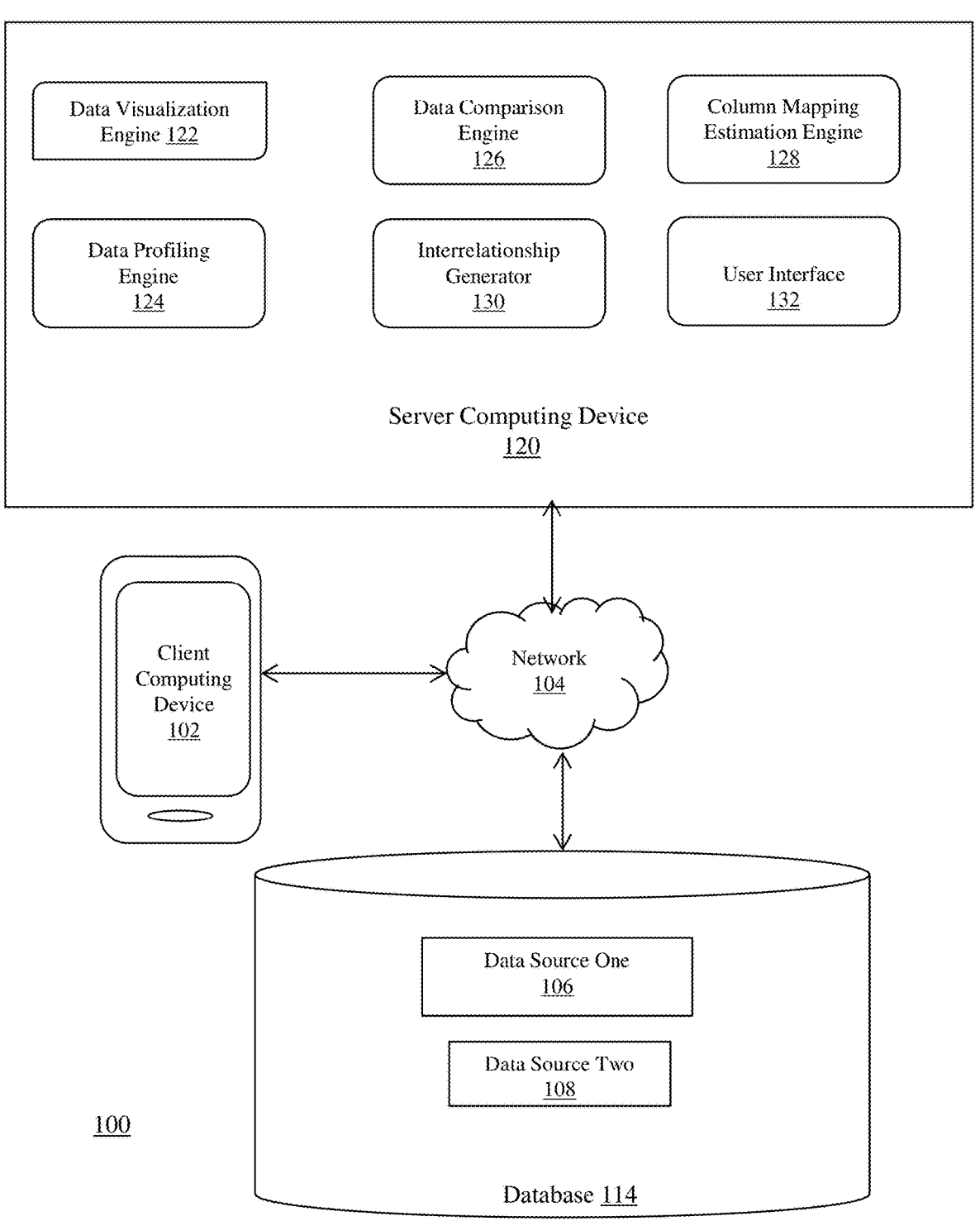
FIG. 1 is a block diagram of a system for electronic data comparison.

FIG. 1 is a block diagram of an exemplary system 100 for electronic data analysis and comparison. The system 100 includes a client computing device 102, a communications network 104, a server computing device 120 that includes a data visualization engine 122, a data profiling engine 124, a data comparison engine 126, a column mapping estimation engine 128, an interrelationship generator 130, and a user interface 132. The system 100 also includes a database 114 storing a plurality of data sources including data source one 106 and data source two 108. The content of the plurality of data sources may overlap and, especially in cases of migrating data from one data source to another, the data comparison and profiling tools discussed herein may be of particular usefulness.

The client computing device 102 connects to one or more communications networks (e.g., network 104) in order to communicate with the server computing device 120 to provide input and receive output relating to electronic data analysis. Analysts or other users may interact with the suite of data analysis engines via a client computing device 102. A user interface 132 such as that on the server computing device 120 or one running on the client computing device 102 and one or more input/output devices can allow the user to enter queries, request analysis of various databases, and review results and visualizations of various profiling and comparison tasks.

Exemplary client computing devices 102 include but are not limited to server computing devices, desktop computers, laptop computers, tablets, mobile devices, smartphones, and the like. Typically, the client computing device 102 includes a display device (not shown) that is embedded in and/or coupled to the client computing device for the purpose of displaying information to a user of the device. It should be appreciated that other types of computing devices that are capable of connecting to the components of the system 100 can be used without departing from the scope of invention. Although FIG. 1 depicts one client computing device 102, it should be appreciated that the system 100 can include any number of client computing devices.

In some embodiments, the client computing device 102 can execute one or more software applications that are used in conjunction with applications or modules on the server computing device 120. For example, the client computing device 102 can be configured to execute one or more native applications and/or one or more browser applications. Generally, a native application is a software application (in some cases, called an 'app') that is installed locally on the client computing device 102 and written with programmatic code designed to interact with an operating system that is native to the client computing device 102. Such software may be available from, e.g., the Apple® App Store, the Google® Play Store, the Microsoft® Store, or other software download platforms depending upon, e.g., the type of device used. In some embodiments, the native application includes a software development kit (SDK) module that is executed by a processor of the client computing device 102 to perform functions (e.g., enter or approve time worked or request time off). Generally, a browser application comprises software executing on a processor of the client computing device 102 that enables the client computing device to communicate via HTTP or HTTPS with remote servers addressable with URLs (e.g., server computing device 120) to receive website-related content, including one or more webpages, for rendering in the browser application and presentation on the display device coupled to the client computing device 102. Exemplary mobile browser application software includes, but is not limited to, Firefox™, Chrome™, Safari™, and other similar software. The one or more webpages can comprise visual and audio content for display to and interaction with a user.

The communications network 104 enables the client computing device 102 to communicate with the server computing device 120 and the database 114 in certain embodiments. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The server computing device 120 is a device including specialized hardware and/or software modules that execute on a processor and interact with memory modules of the server computing device 120, to receive data from other components of the system 100, transmit data to other components of the system 100, and perform functions (e.g., access data from various databases and other sources and run analyses and/or comparisons per user requests). As discussed above the server computing device 120 includes a data visualization engine 122, a data profiling engine 124, a data comparison engine 126, a column mapping estimation engine 128, an interrelationship generator 130, and a user interface 132 along with any number of other programs that may execute on the processor of the server computing device 120 and may each, despite being disparate programs, rely on a regular exchange of data between them and/or the database 114. In some embodiments, the various modules, programs, or applications are specialized sets of computer software instructions programmed onto one or more dedicated processors in the server computing device 120 and can include specifically designated memory locations and/or registers for executing the specialized computer software instructions.

Although the applications and modules are shown in FIG. 1 as executing within the same server computing device 120, in some embodiments the functionality of the applications and modules can be distributed among a plurality of server computing devices. It should be appreciated that any number of computing devices, arranged in a variety of architectures, resources, and configurations (e.g., cluster computing, virtual computing, cloud computing) can be used without departing from the scope of the invention. The exemplary functionality of the applications, programs, and/or modules is described in detail throughout this specification.

The database 114 is a computing device (or in some embodiments, a set of computing devices) coupled to the server computing device 120 and is configured to receive, generate, and store specific segments of data relating to business meaning translation of database metadata. In some embodiments, all or a portion of the database 114 can be integrated with the server computing device 120 or be located on a separate computing device or devices. The database 114 can comprise one or more databases configured to store portions of data used by the other components of the system 100, as will be described in greater detail below.

As noted, in some embodiments, the database 114 comprises a plurality data sources and the systems and methods can be used to aid in migration of data, analysis of data, and/or identification, flagging, and culling of redundant data.

FIG. 2 shows an exemplary method 201 for electronic data comparison. Steps can be performed using a column mapping engine and can include comparing 203 column names between a first electronic data table and a second electronic data table. Columns having 100% column name similarities between the first and second electronic data tables can then be defined 205 as matches. A fuzzy string matching algorithm (token sort ratio) can then be applied 207 to any unmatched column names from the defining step to produce a similarity score for each pair of unmatched column names between the first and second electronic data tables.

Columns can be classified 209 as matches when the similarity score for the pair of unmatched column names is above a selected threshold. A number of sample records can then be selected 211 from remaining columns in the first and second electronic data tables not matched in the defining or classifying steps. The sample records from each remaining column in the first electronic data table can then be compared 213 to the sample records from each remaining column in the second electronic data table to determine a data match score. Remaining columns from the first electronic data table can then be mapped 215 as matches to remaining columns from the second electronic data table based on highest data match score.

Figure 3:
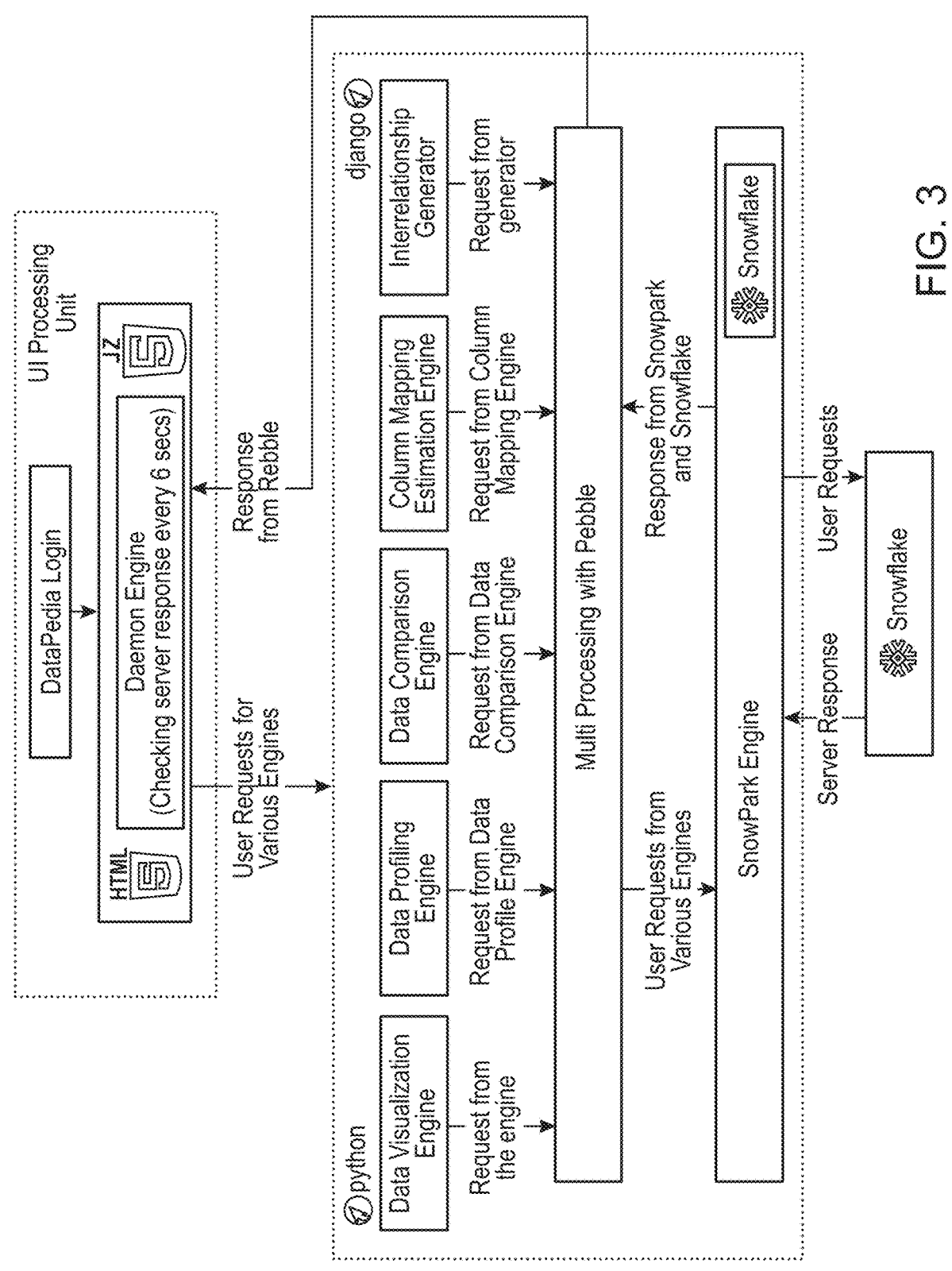
FIG. 3 illustrates exemplary data architecture for systems and methods for electronic data comparison.

FIG. 3 illustrates an exemplary data architecture for systems and methods for electronic data comparison. For a suite of database and analysis and comparison tools, each function may be performed by a different engine all of which can access user data or any other types of data from any number of databases. The various engines can be operable to perform data visualization, data profiling, data comparison, column mapping estimation, and to generate interrelationships and can be housed on a web server, for example using the Python-based web framework Django (Django Software Foundation). The various python threads and processes associated with the data analysis tools can be managed in using Pebble. A daemon engine within a user interface processing unit can communicate with the web-server-based suite of data analysis tools and allow for a user to request analyses and review results and visualizations thereof.

In various embodiments, data analysis tools of the invention may be referred to as a DataPedia. The systems and methods herein may be of particular use to data engineers, business analysts and data scientists. As discussed throughout, the analysis tools of the invention can perform the features of prior profiling tools with increased speed and, therefore, cost effectiveness. Additionally, systems and methods of the invention offer new features. Systems and methods herein can offer both data profiling and data comparison functionality.

Data profiling can provide information about the data present inside a table/view through an easy-to-use UI. If a user comes across a data set for the first time this feature can be used to quickly and accurately summarize how the data is organized an allow for multiple ways to interact with the data.

Within the category of data profiling, features can include a metadata view using the prestored information of the table/view to give metadata information. The metadata information can include type, comment, size, total row count, no. of columns, clustering information (clustering key present or not and if present, on which column), and column definition (e.g., column name, column data type, and comment if any). This view can be automatically visible on the right side of a user interface tab as soon as the user selects an object. Because the system does not require a query to fetch the data, costs associated with running such queries can be reduced while still providing a snapshot of the information therein to a user.

Another possible data profiling category is column level information which provides information about a particular column. This information can include Max/Min value, Number of Unique values, most frequent values, Presence of NULL values, Space, Visualization Graphs. Data profiling is discussed in more detail below.

Data comparison is another feature of the systems and methods described herein and can be used to compare two different tables even across different formats or providers (e.g., Snowflake to ORACLE). Comparison tools can be used to get column mapping (aligning columns between two different tables) which conventionally has required significant man hours and manual effort. Data matching is another valuable comparison feature where a user can check the % MATCH or % VARIANCE between datasets of disparate data sources (e.g., from ORACLE and Snowflake databases). This feature can process millions of rows in a matter of seconds and can be helpful in bringing down the time taken by developers to perform data validation.

In order to compare two tables, users can use a replication utility to copy Oracle data into another database and then compare it with a Snowflake table. Users can also leverage tools to validate any new filters or logic added in an old table. In order to do that a user can create a table/view of the data and compare it with a target Snowflake table.

Data Profiling

Data profiling is one of the foremost applications of the systems and methods describe herein. In various embodiments, a data profiling feature can be used to analyze a table/view of interest. Exemplary data profiling output includes 1. Metadata: Total rows, Clustering keys, Size of object, Column definition and 2. Column level data insights: Max/Min value, Number of Unique values, most frequent values, Presence of NULL values, Space, Visualization Graphs.

Figure 4:
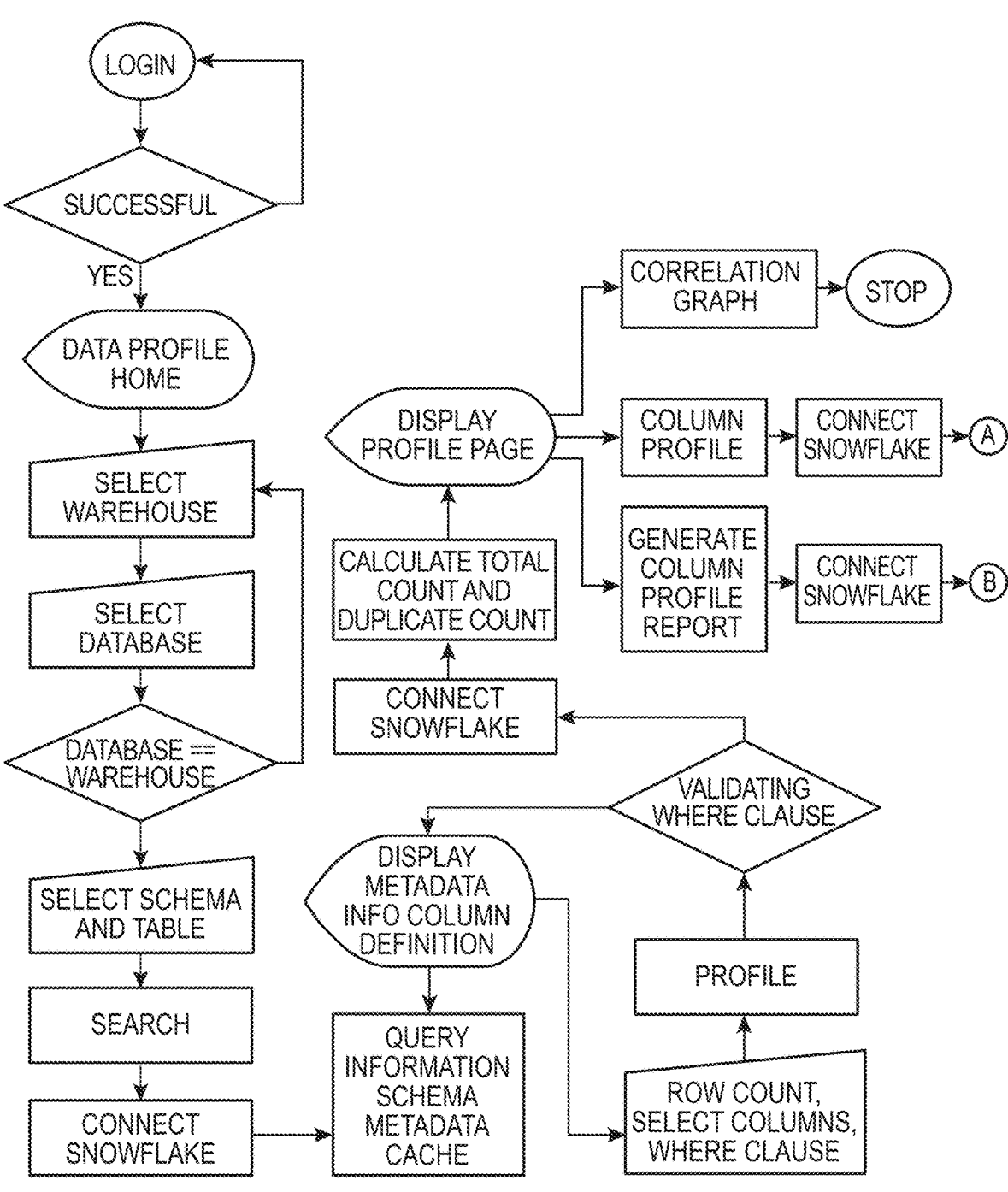
FIG. 4 illustrates an exemplary flow chart for data profiling according to certain embodiments.
Figure 4:
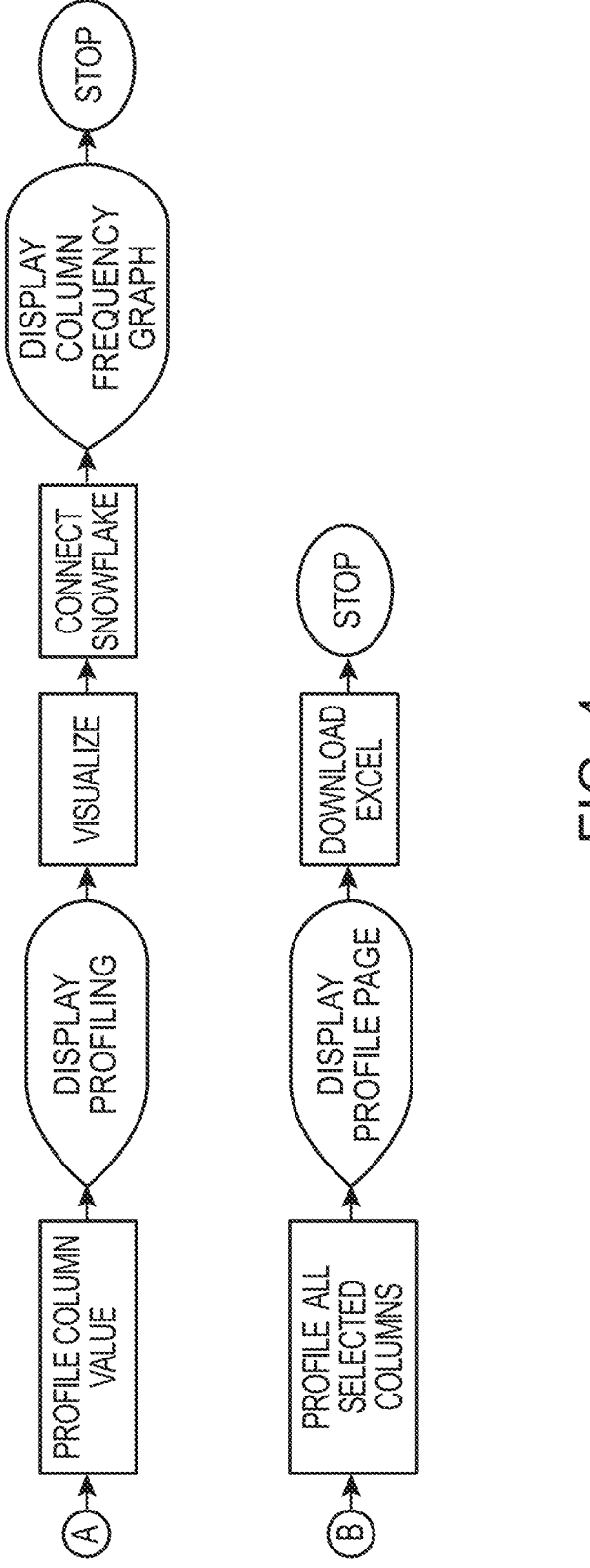

FIG. 4 illustrates an exemplary flow chart for data profiling according to certain embodiments. A user logs in and, if successful, is taken to a data profile home user interface.

Figure 6:
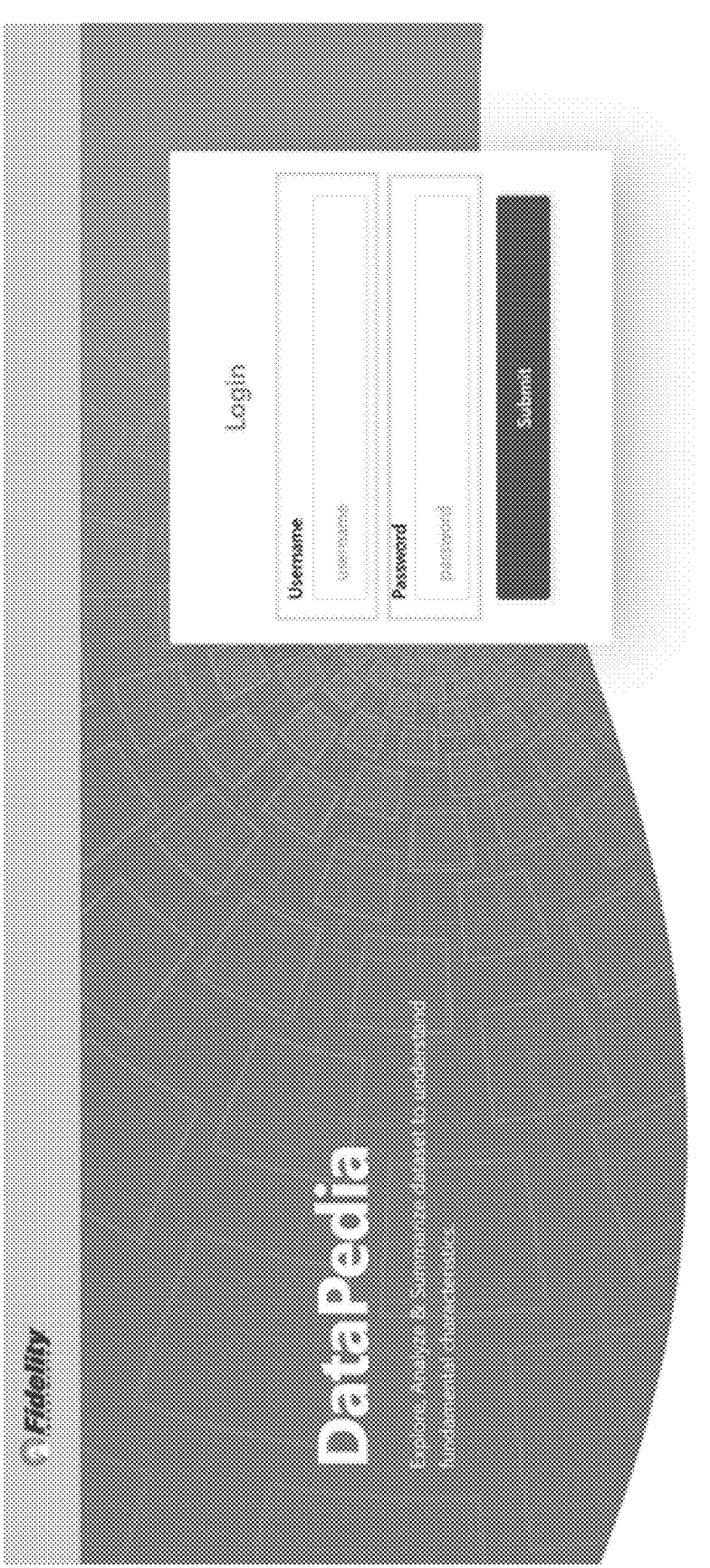
FIG. 6 shows an exemplary user interface for user access to data analysis tools.

A user interface such as shown in FIG. 6 can be used to login to the system tools in order to restrict and record access to potentially sensitive data.

Figure 7:
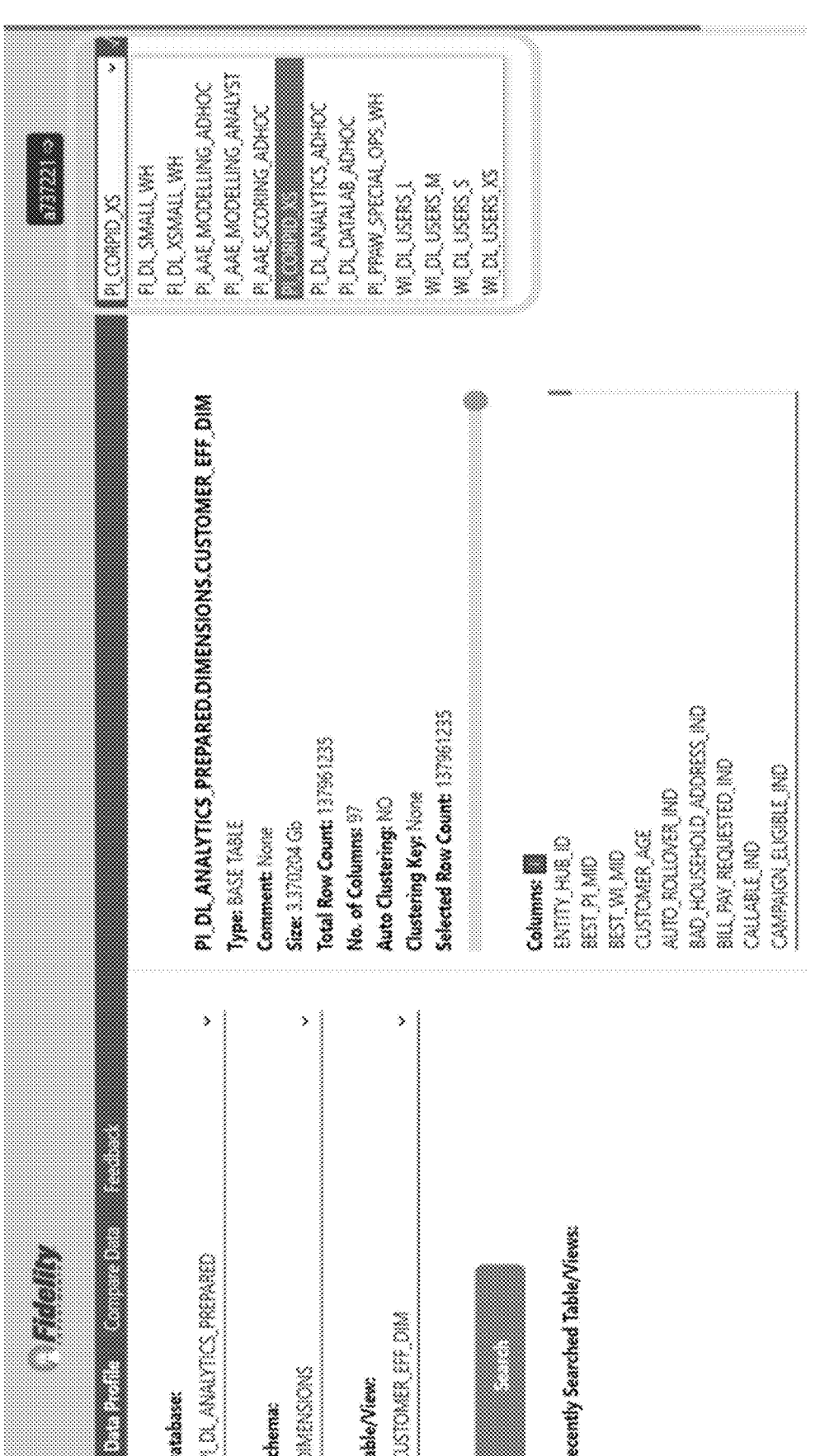
FIG. 7 shows an exemplary user interface for selection of a data warehouse.
Figure 8:
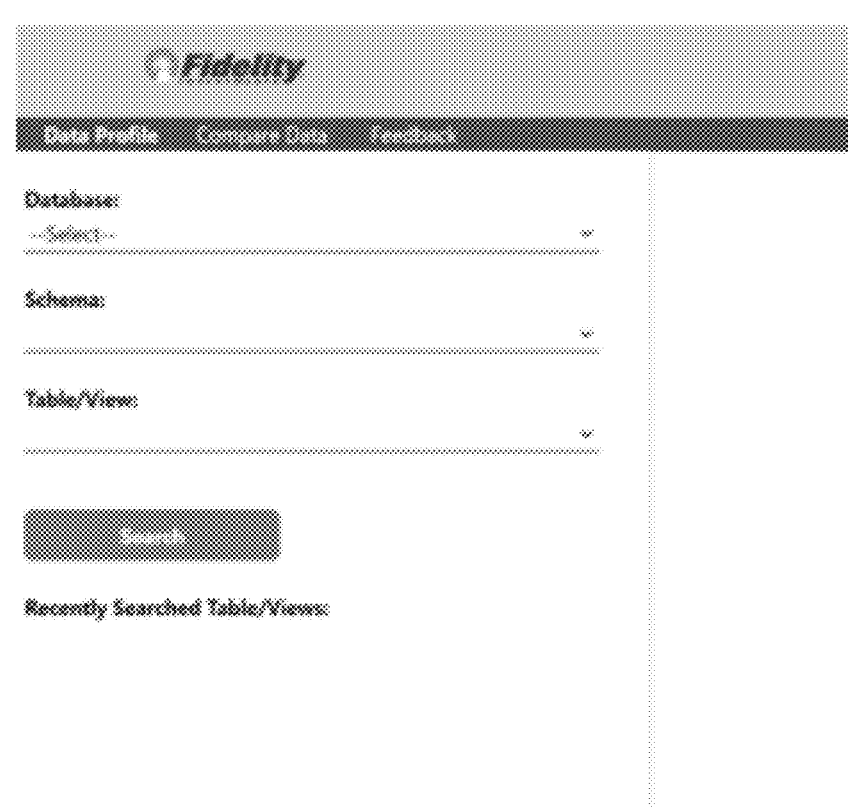
FIG. 8 shows an exemplary user interface for selection of an object.

Once logged in, the user can select a warehouse by, for example, clicking on a drop down menu and clicking on the required warehouse name to select it. Selecting an appropriate warehouse can be important as not all warehouses may have access to the target object. FIG. 7 shows an exemplary user interface for selection of a data warehouse. A user can be directed to a data profile tab where they can select the desired object name to be profiled and then select from each dropdown, the Database, Schema, and Table/Views in the same order and click on the required object names. FIG. 8 shows an exemplary user interface for selection of an object.

Figure 9:
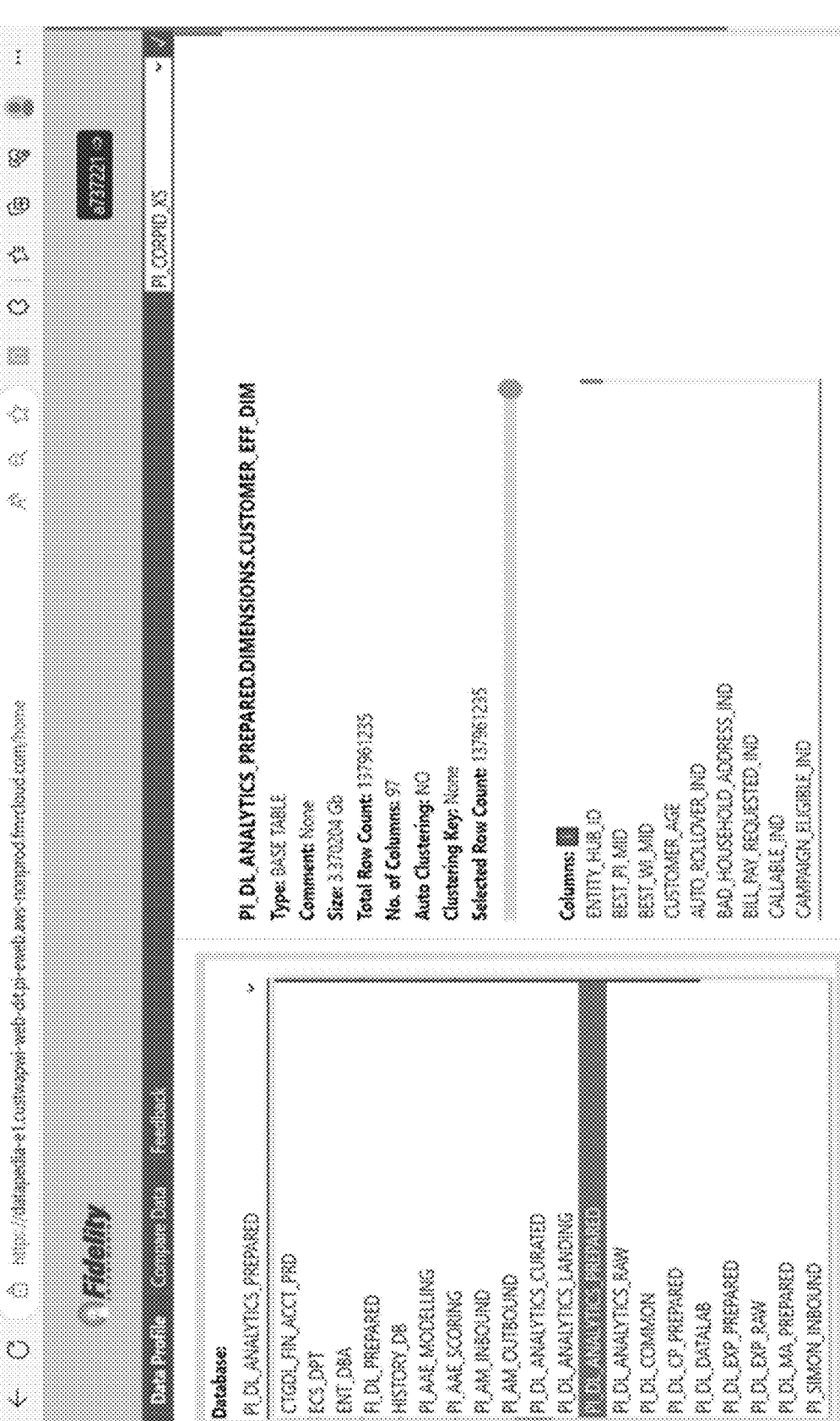
FIG. 9 shows an exemplary user interface for selecting database and schema selection.
Figure 10:
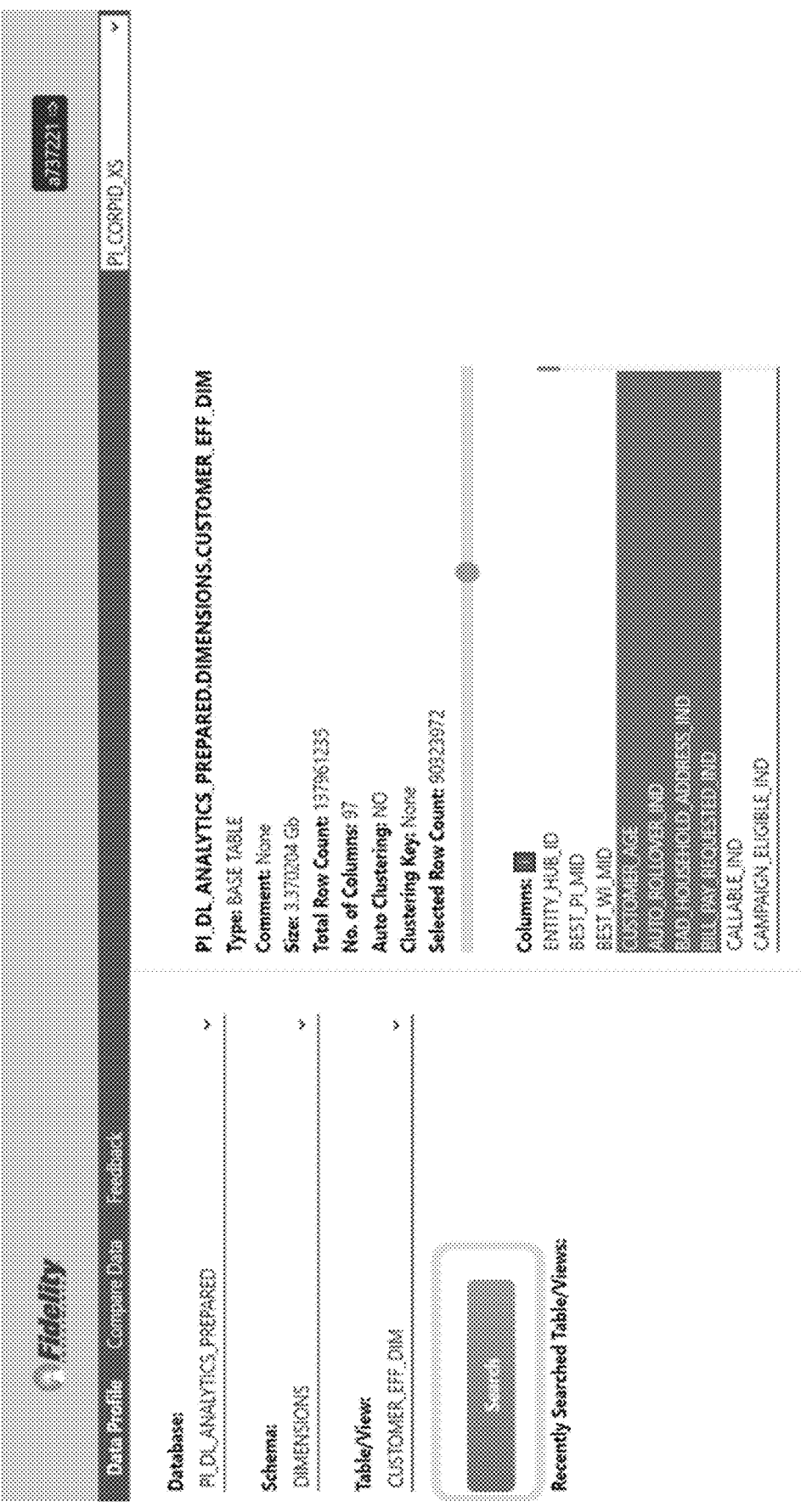
FIG. 10 shows an exemplary user interface displaying basic table/view information.

FIG. 9 shows an exemplary user interface for selecting database and schema selection. A user can drag or scroll to reach the desired database and click to select as shown in the FIG. 9 and can follow the same process to select schema and table/views. After selecting the database, schema, and table/ view information, a user can click the search button. The system can then connect to the database (e.g., snowflake) and query an information schema metadata cache. The system can provide basic information on the table/view as in FIG. 10.

Figure 11:
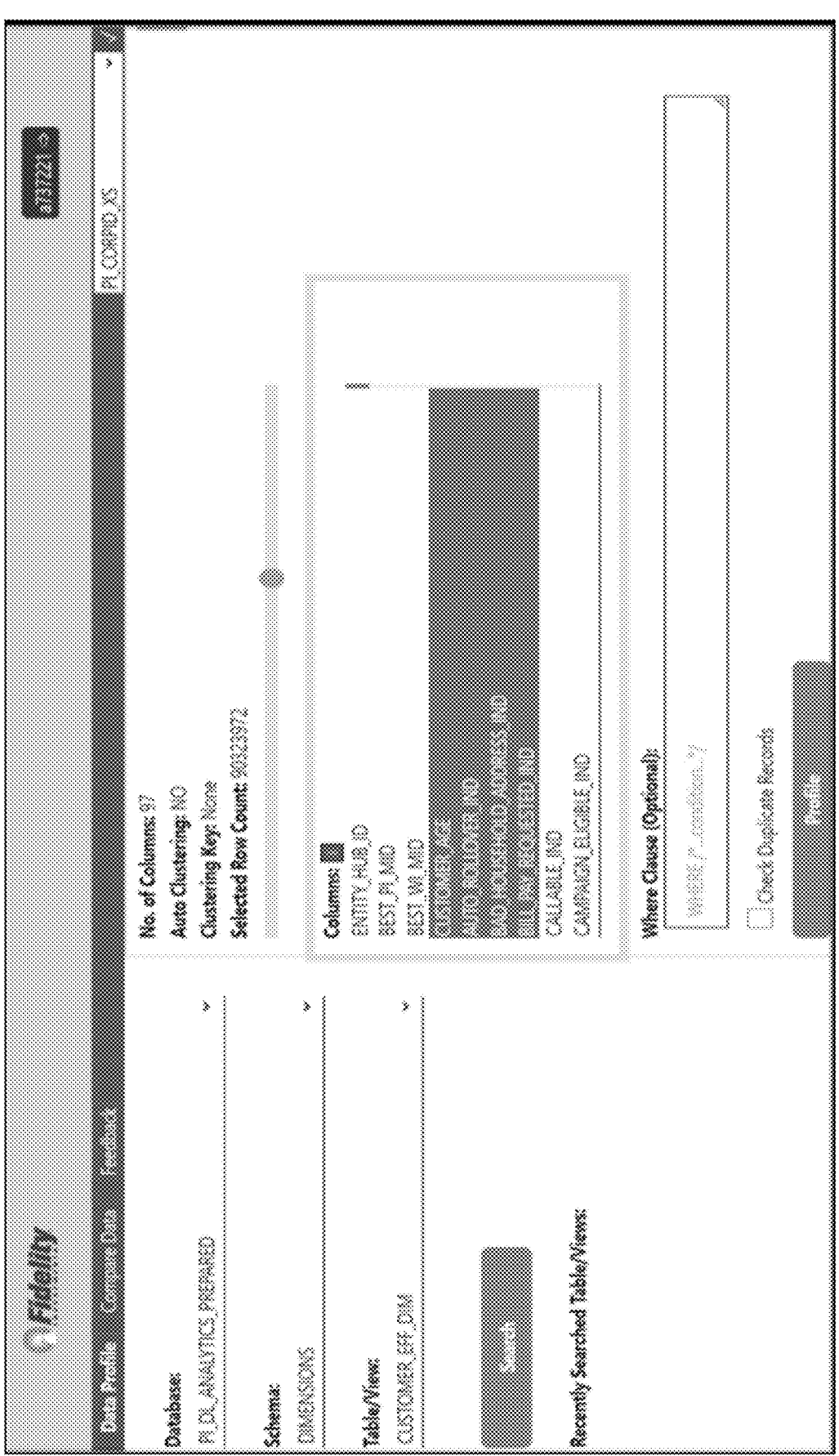
FIG. 11 shows an exemplary user interface for selecting columns for profiling.
Figure 12:
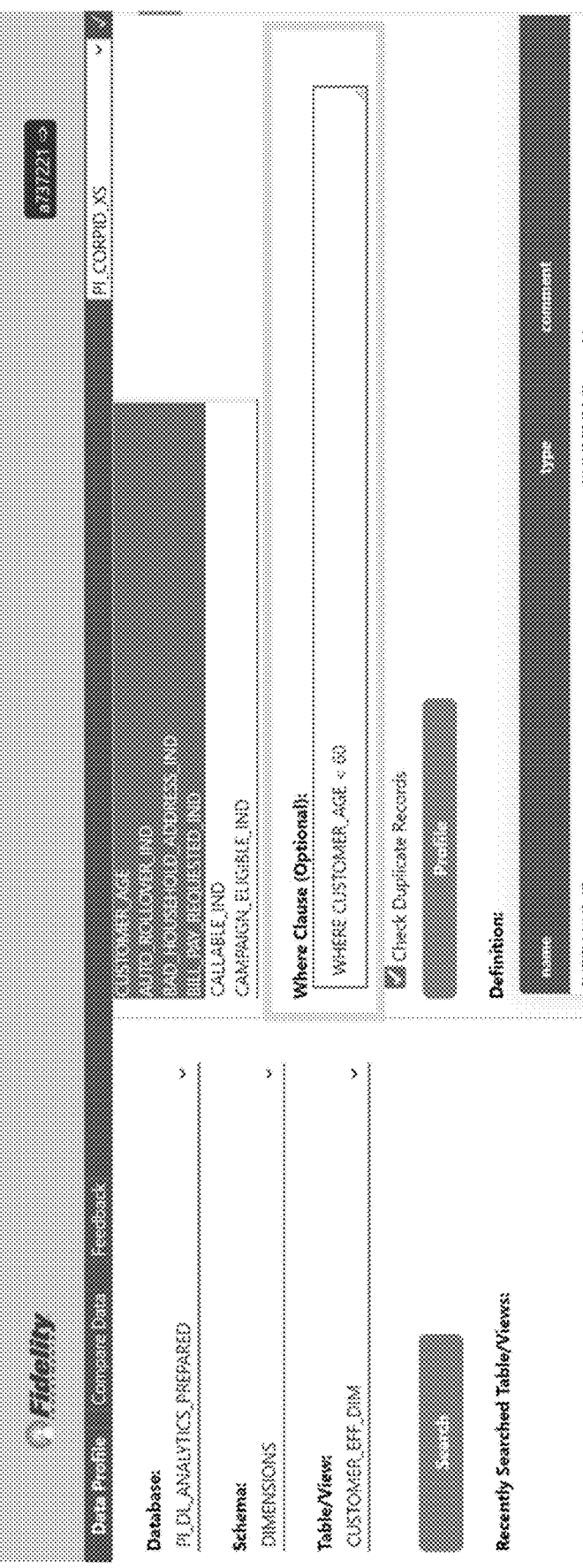
FIG. 12 shows an exemplary user interface for adding where clauses.
Figure 13:
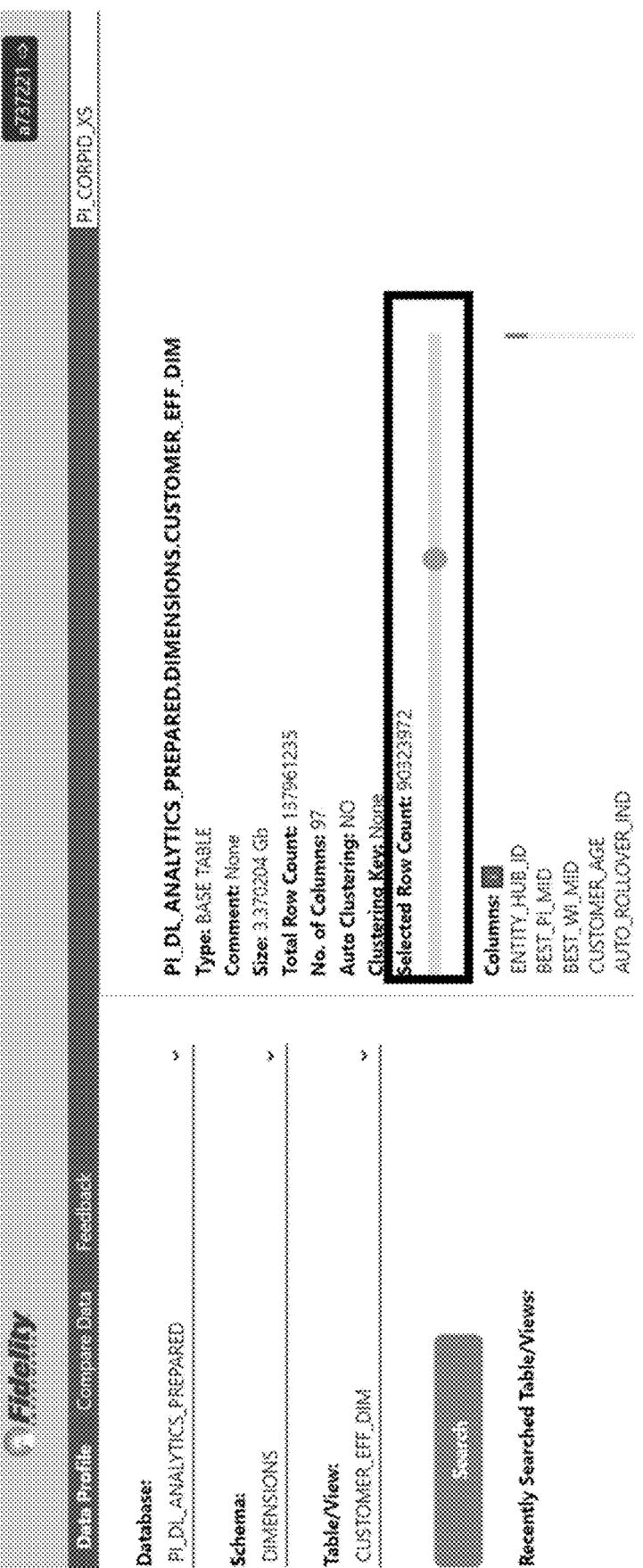
FIG. 13 shows an exemplary user interface for adjusting the number of rows for profiling.
Figure 14:
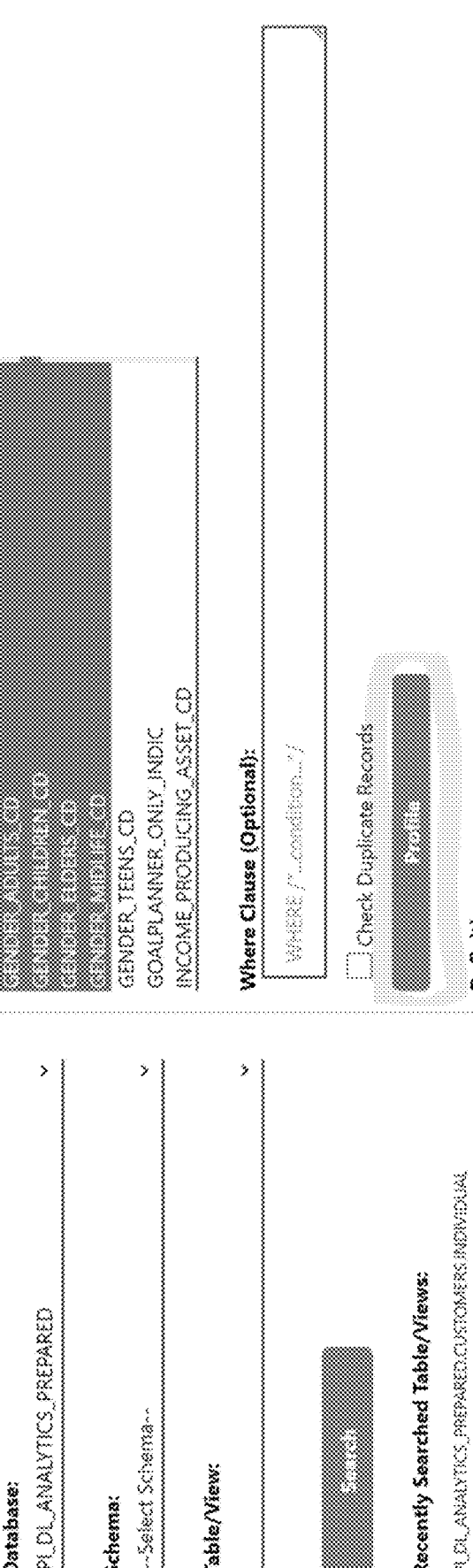
FIG. 14 shows an exemplary user interface for performing data profiling.

FIG. 11 shows an exemplary user interface for selecting columns for profiling. The use can scroll through the column list an select desired columns for profiling. A user can also add optional where clauses as shown in FIG. 12 and adjust the number of rows selected as shown in FIG. 13 (e.g., by moving a slider). The user can then perform the profiling by, for example, selecting the profile button as shown in FIG. 14. The system can then validate any where clauses connect to the database system (e.g., Snowflake), calculate total count and duplicate count, and display a profile page. The system can provide a correlation graph, column profiles, and generate column profile reports.

Figure 15:
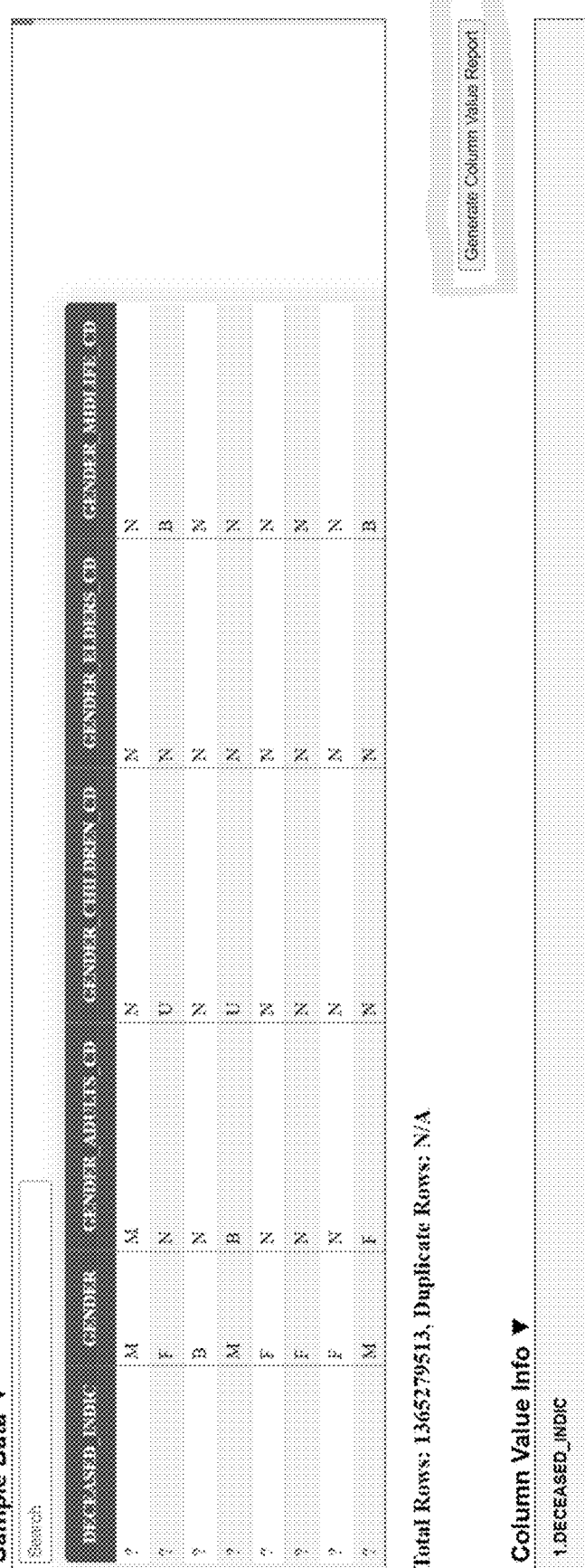
FIG. 15 shows an exemplary user interface displaying sample data and for generation of column value reports.
Figure 16:
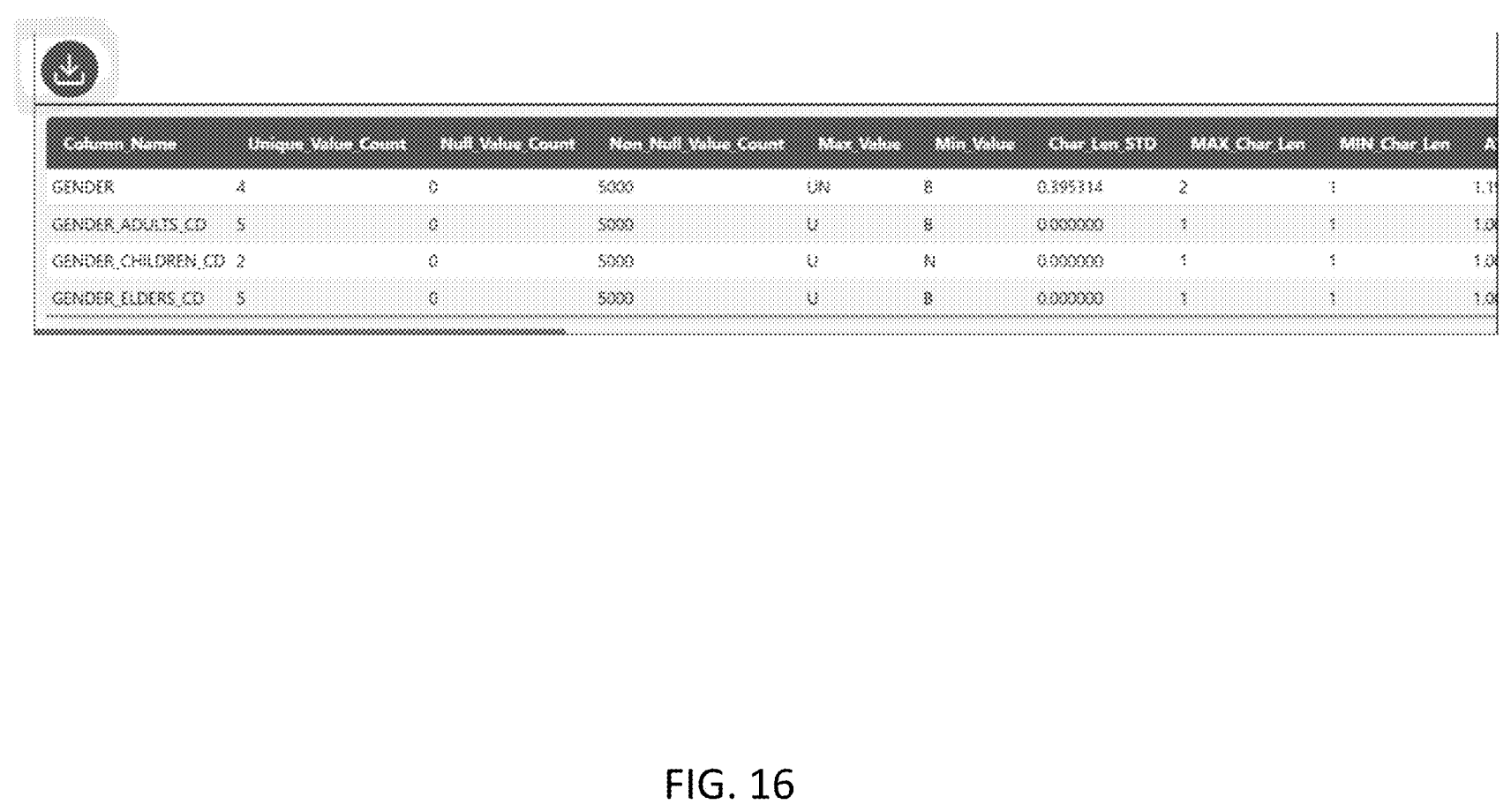
Figure 17:
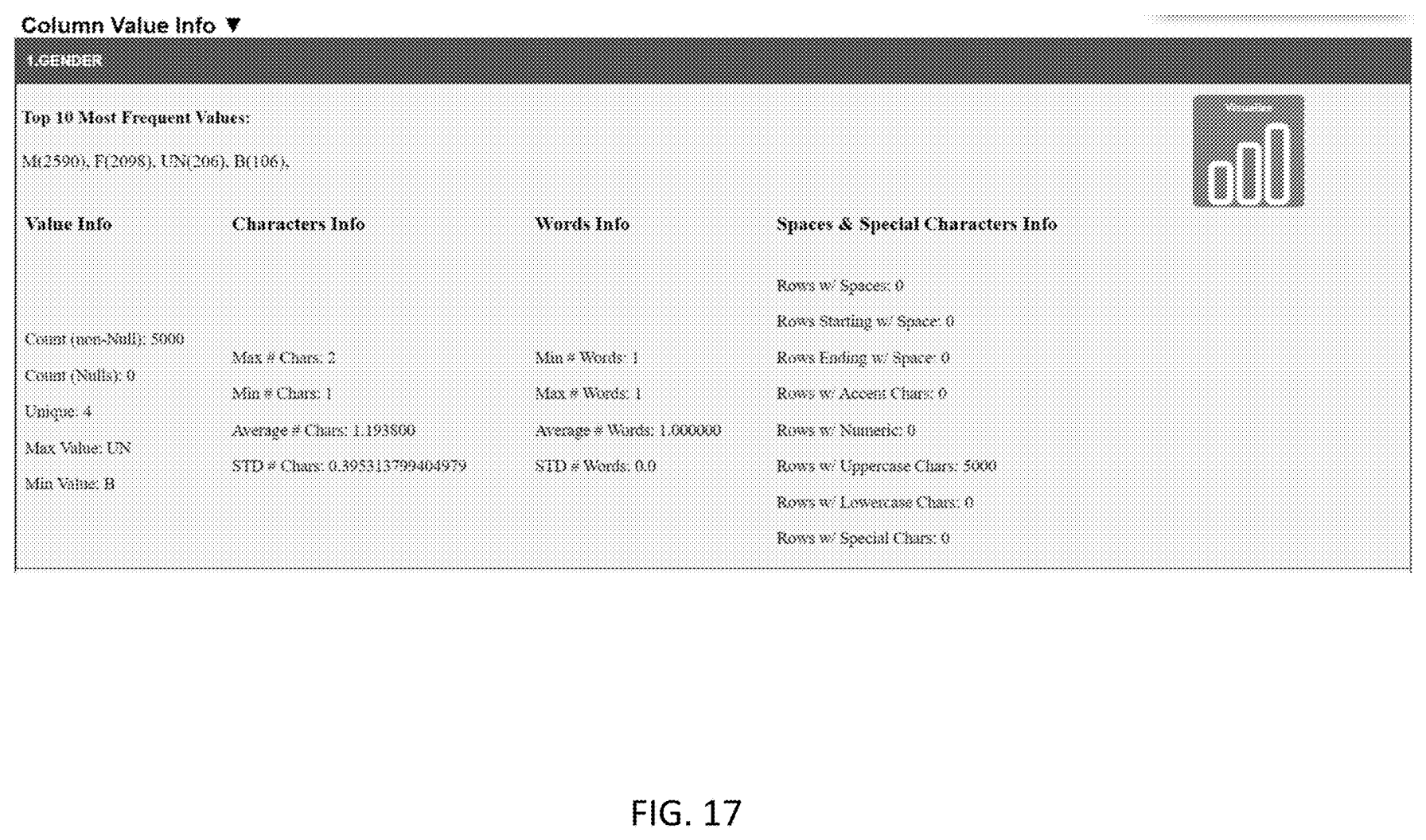
Figure 18:
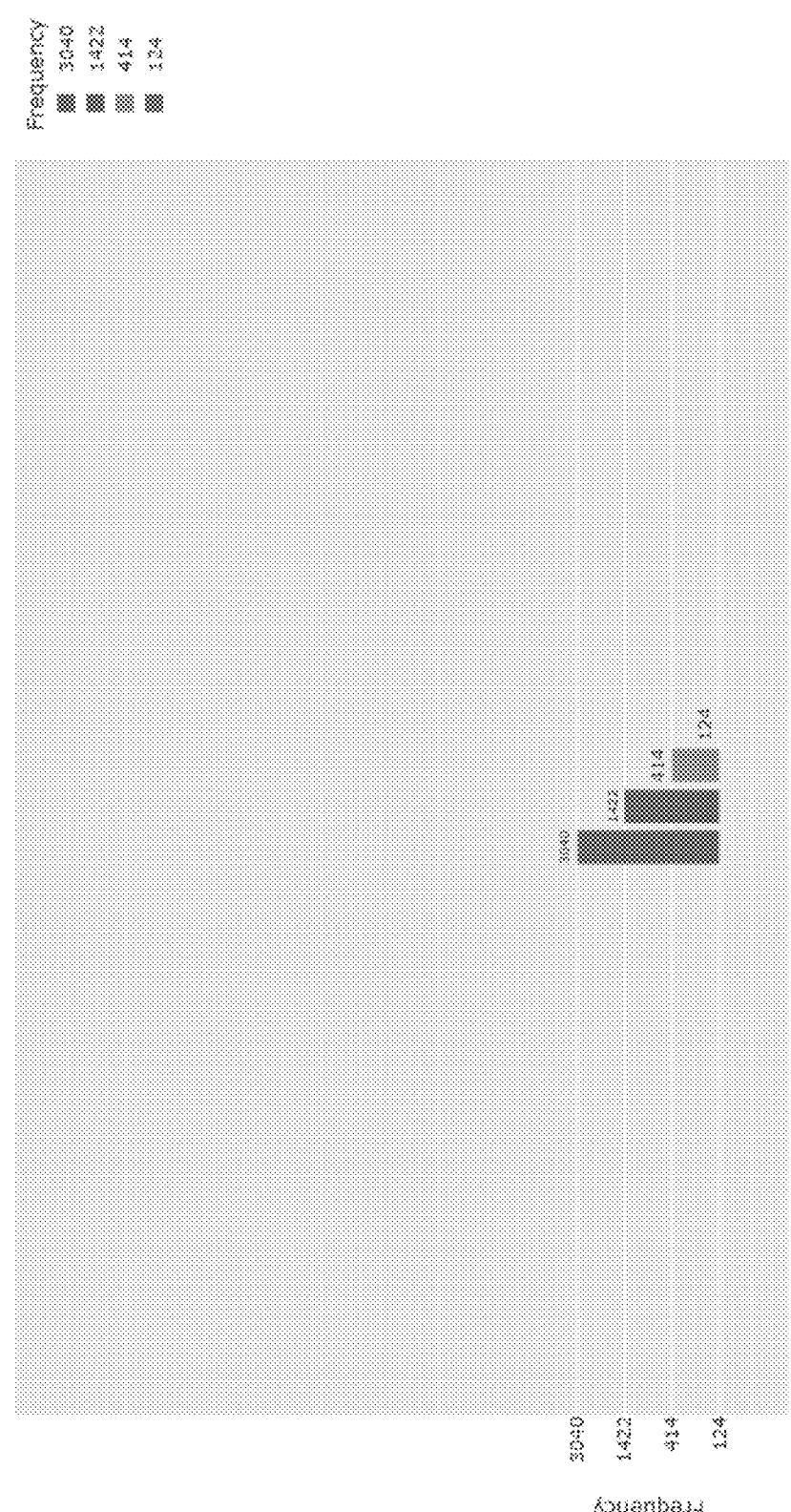
FIG. 18 shows an exemplary user interface displaying column value information in a graph visualization.

FIG. 15 shows an exemplary user interface displaying sample data and for generation of column value reports. In order to receive profiling results all at once for all columns, a user may request the system to generate column value report. Alternatively, the user can select specific columns to generate a report for. FIG. 16 shows an exemplary user interface displaying a column value report. FIG. 17 shows an exemplary user interface displaying column value information for a selected column that might be displayed should a user select an individual column from the interface in FIG. 16 for additional information. In various embodiments, the system can allow for visualization of the column information in a graph format as shown in FIG. 18.

Data Comparison

Figure 5:
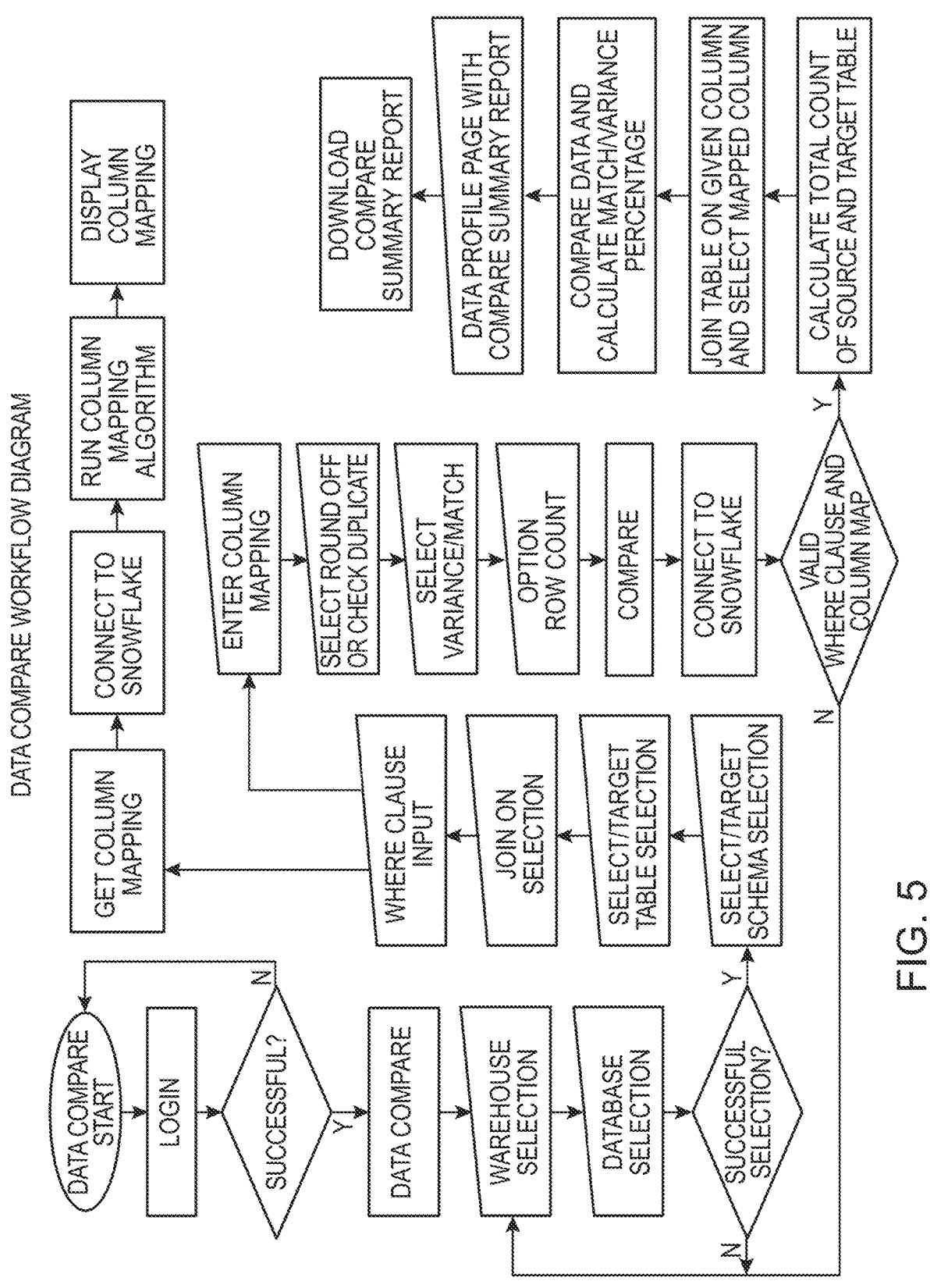
FIG. 5 illustrates an exemplary flow chart for data comparison according to certain embodiments.

Data comparison can be particularly useful in validation of data between different databases and database formats using multiple features designed to reduce the amount of time required to do the same manually. FIG. 5 illustrates an exemplary flow chart for data comparison according to certain embodiments.

Figure 19:
FIG. 19 shows an exemplary user interface for user access to data comparison tools.
Figure 20:
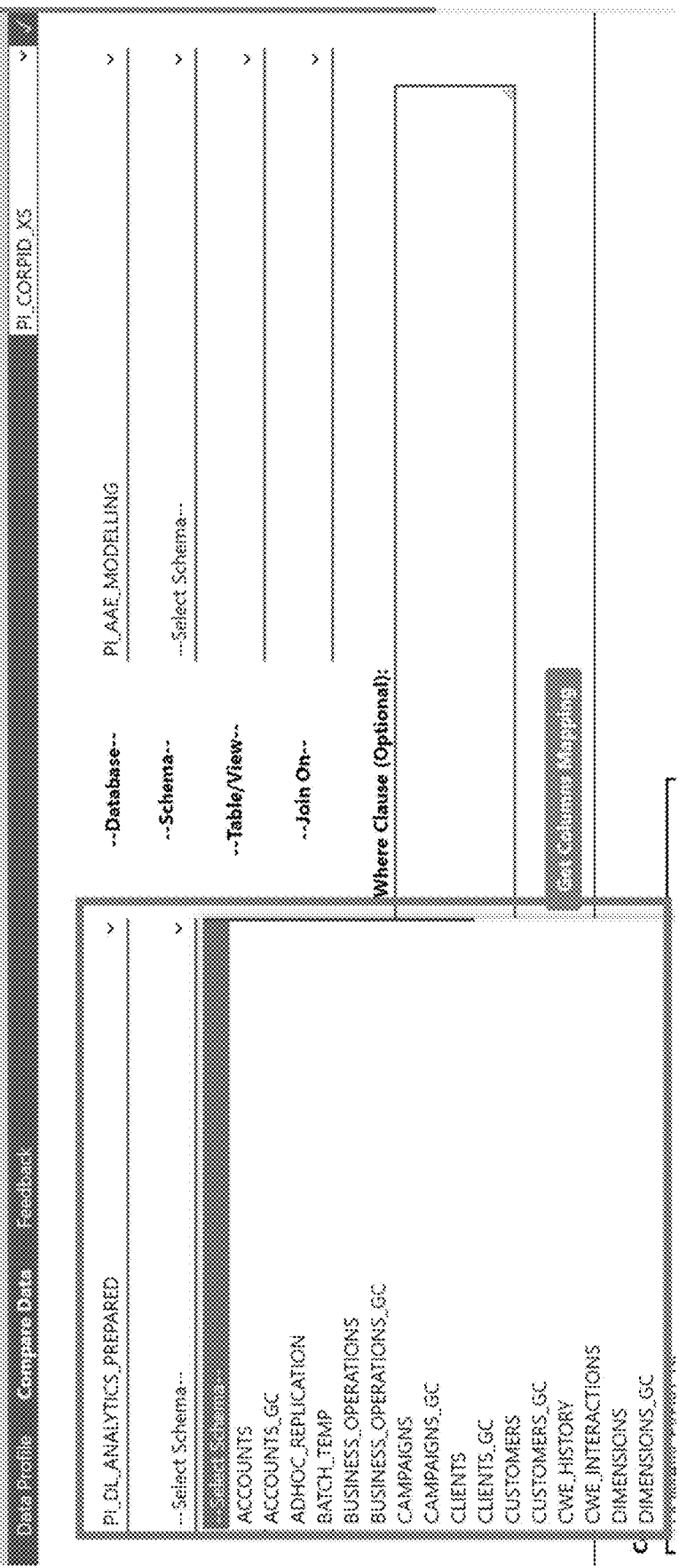
FIG. 20 shows an exemplary user interface for selecting a first database, schema, and table/view.
Figure 21:
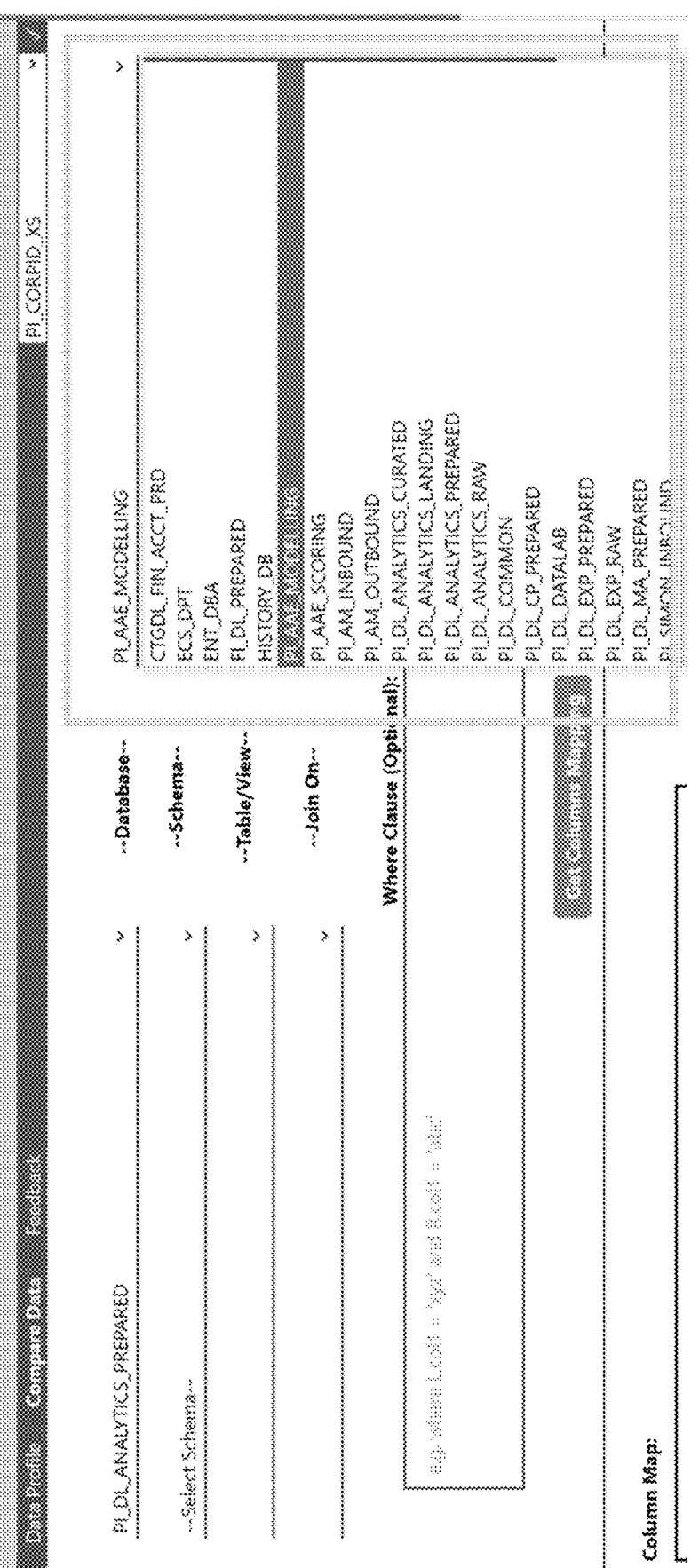
FIG. 21 shows an exemplary user interface for selecting a second database, schema, and table/view from drop down menus for a second database.
Figure 22:
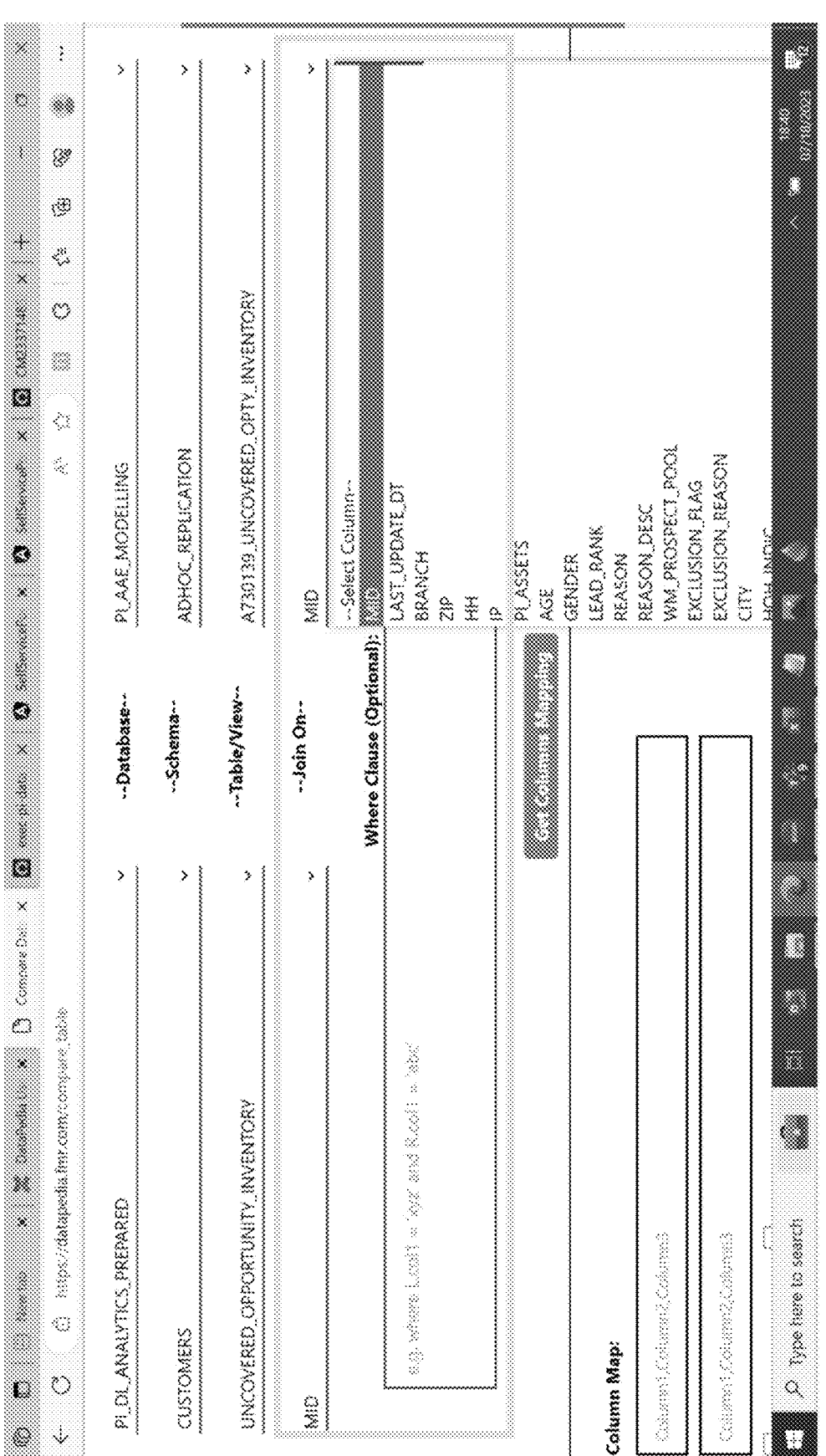
FIG. 22 shows an exemplary user interface for defining a join condition for two tables to be compared.

FIG. 19 illustrates an exemplary user interface for user access to data comparison tools. FIG. 20 shows an exemplary user interface for selecting a first database, schema, and table/view from drop down menus for a first database, which may be in a first format. FIG. 21 shows an exemplary user interface for selecting a second database, schema, and table/view from drop down menus for a second database, which may be in a second format different from the first in order to compare the first and second databases. A user can optionally define a join condition as shown in FIG. 22. The user can then initiate a comparison of the two selected tables.

Figure 23:
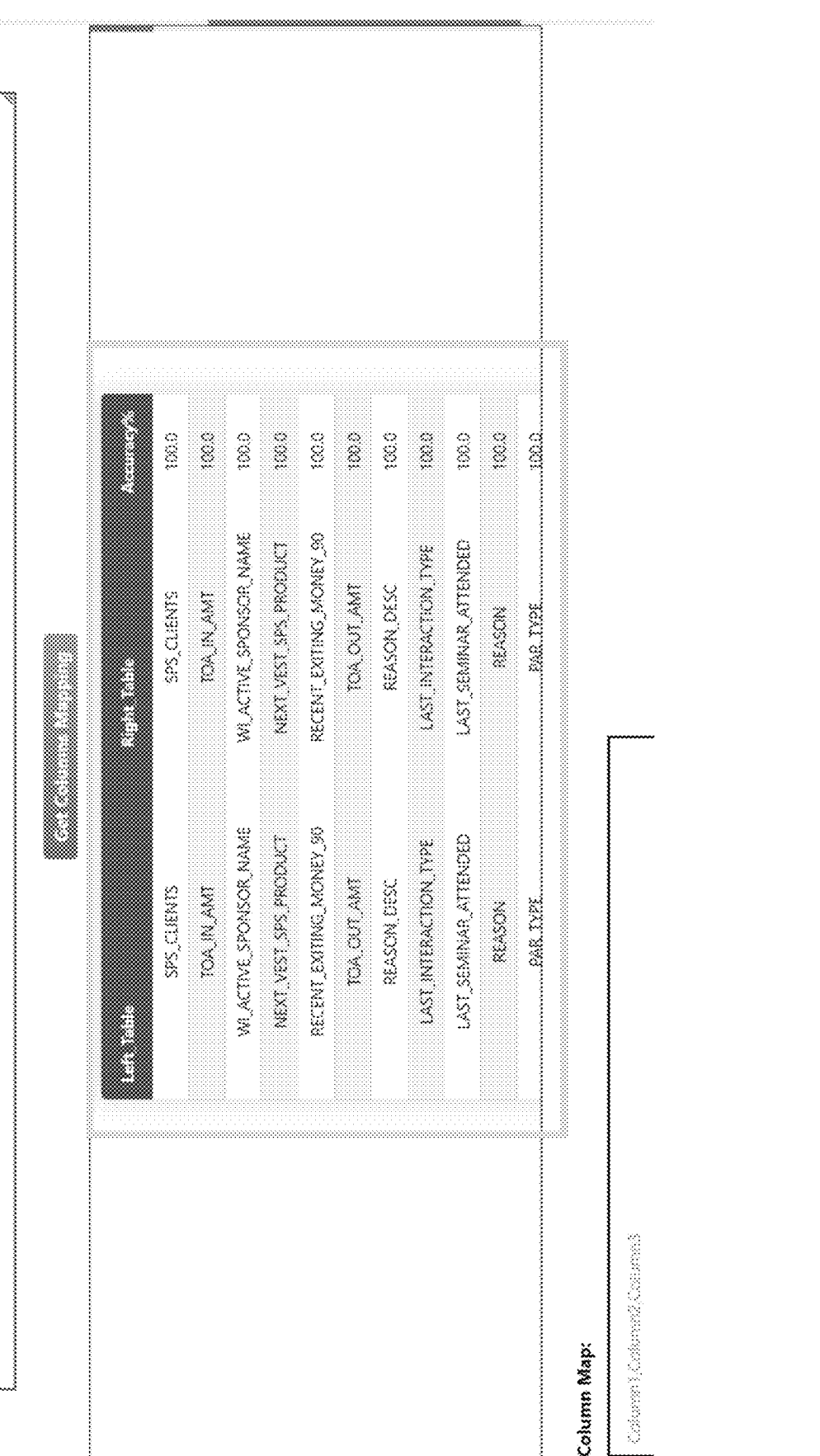
FIG. 23 shows an exemplary user interface displaying column mapping overview information.
Figure 24:
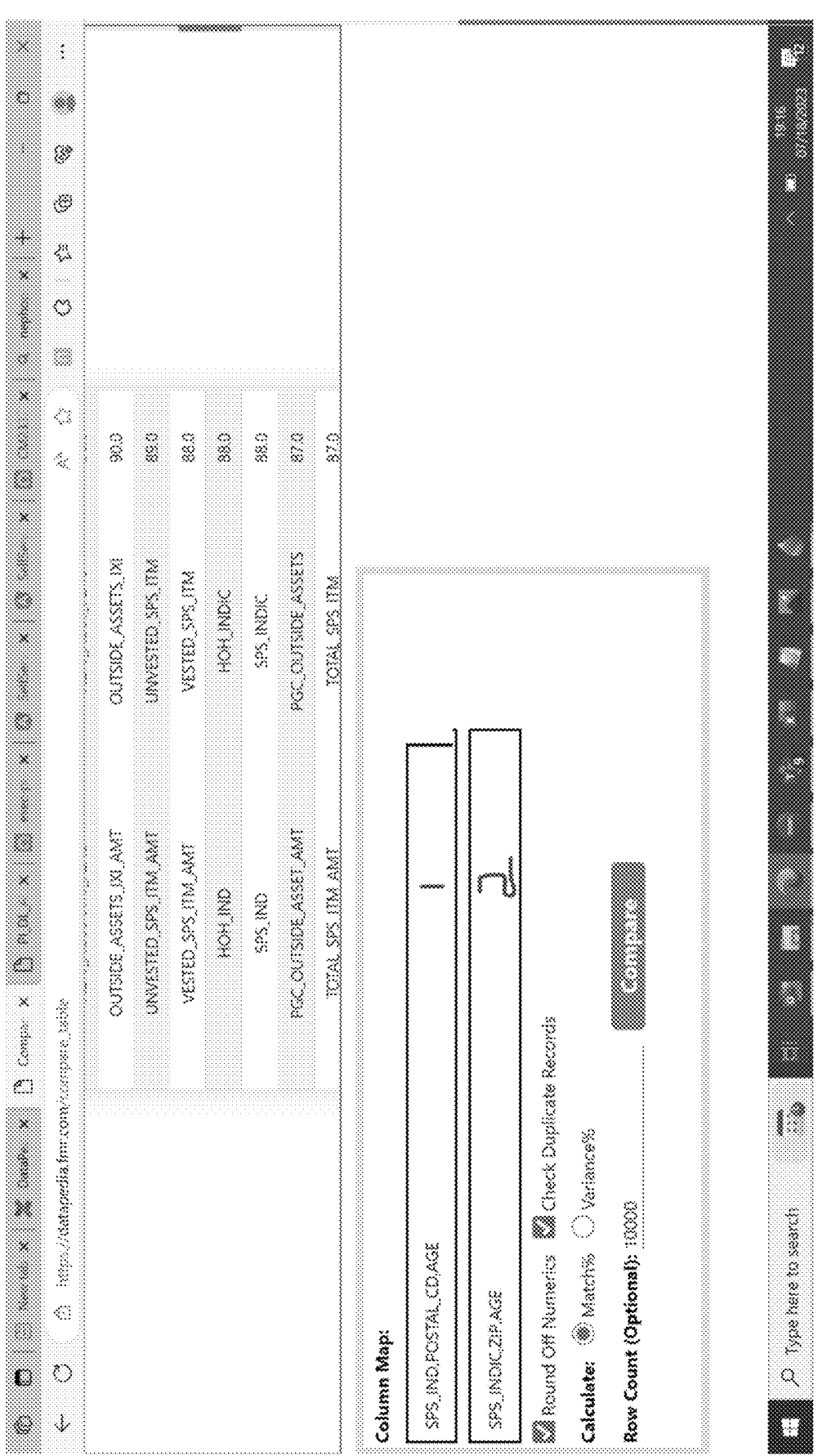
FIG. 24 shows an exemplary user interface for column mapping details.

FIG. 23 shows an exemplary user interface displaying column mapping overview information. The user can type two columns into the column map boxes as shown in FIG. 24 to have those columns compared. The user can select to round of decimal numbers, can opt to check for duplicate records, and can provide a desired row count. FIG. 24 shows an exemplary user interface for column mapping details.

Figure 25:
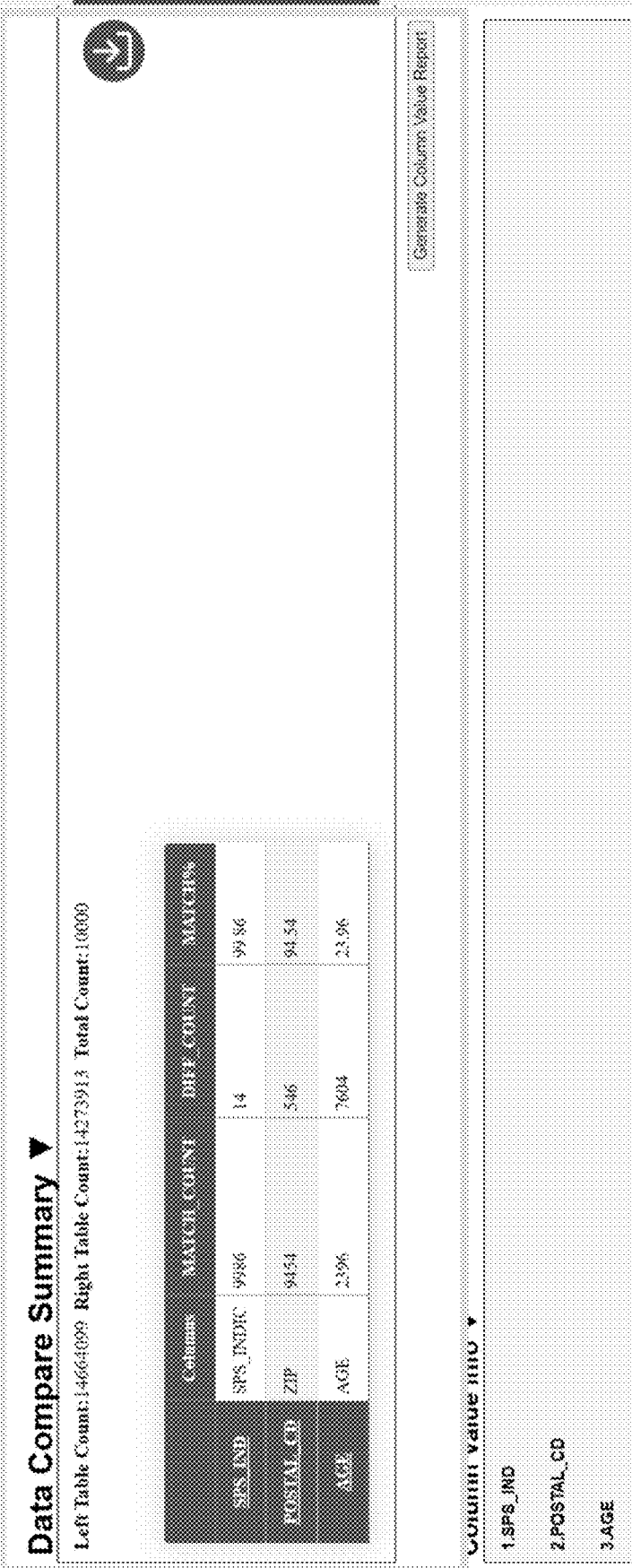
FIG. 25 shows an exemplary user interface displaying column match information.
Figure 26:
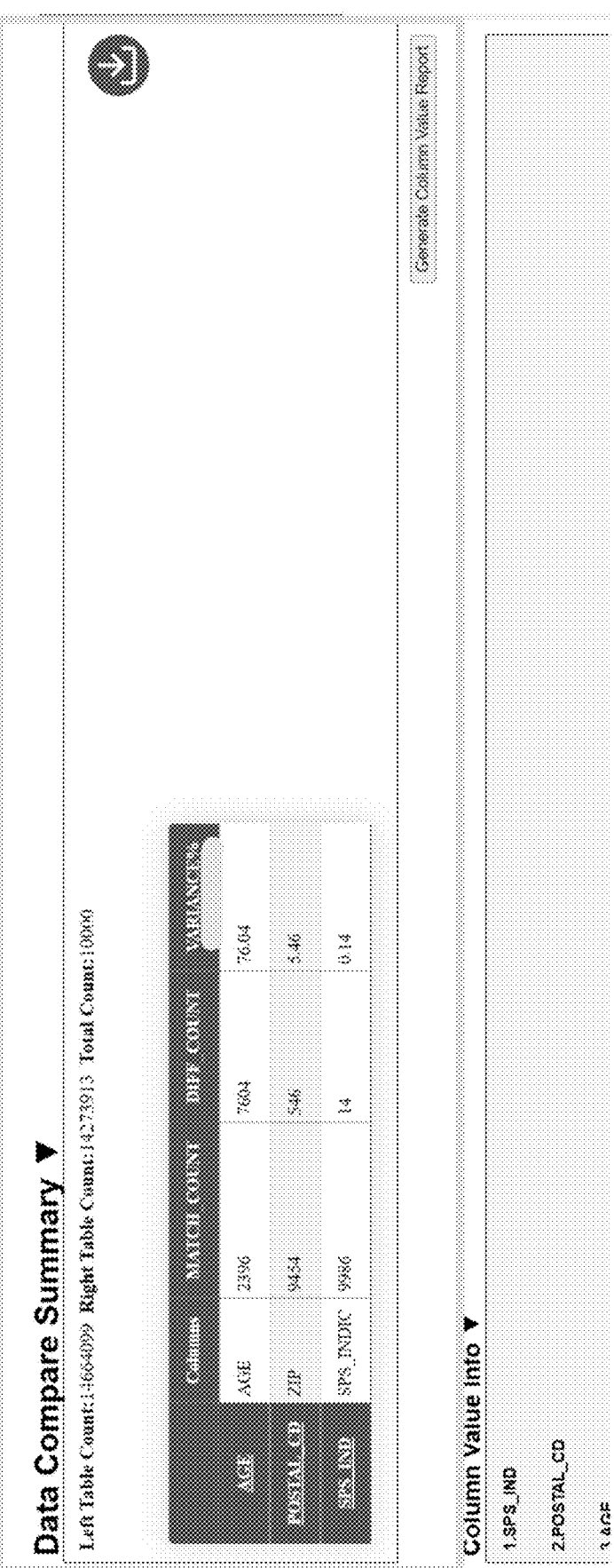
FIG. 26 shows an exemplary user interface displaying column variance information.

The user has the option to display results by Match % and/or Variance % which will give the percentage value of the number of similar records and number of variable records respectively between the two datasets. FIG. 25 shows an exemplary user interface displaying column match information and FIG. 26 shows an exemplary user interface displaying column variance information.

Column Mapping is one aspect of data comparison. In order to compare data, one needs to figure out which column pair should be compared between two tables. Some tables can have more than 100 columns and without proper documentation by a subject matter expert this can be a tedious task for many analysts and data engineers even before they can even begin with comparing and analyzing discrepancies between tables. Systems and methods of the invention can alleviate these problems and help users quickly generate estimated column mapping between two tables and report the accuracy of the mapping. To use column mapping a user can login to the application and select the tables to be compared as discussed above.

A three-step algorithm can be used to achieve the mapping. In the first step, exact matches are identified. A list of columns names of both the tables is analyzed for exact matches. If there is a match those two columns are mapped with 100% reported accuracy. For all the columns that are not mapped in first step, they are processed in a partial match step. In various embodiments, this step can use a python library called FuzzyWuzzy, this open-source library provides a method called TOKEN SORT RATIO. In token sort ratio, the strings are tokenized and pre-processed by converting to lower case and getting rid of punctuation. The strings are then sorted alphabetically and joined together. After this, the Levenshtein distance similarity ratio is calculated between the strings. The output of the code gives 100 as the token sort ratio is found after sorting the strings alphabetically and hence the original order of words doesn't matter.

If a pair of column names are matching more than, for example, 60%, then those two columns can be mapped to one another and the accuracy for the match reported as the ratio returned by FuzzyWuzzy. This threshold value (e.g., 60%) can be adjusted as per user requirements.

The third step can include a data match. Users can select tables to be compared and provides column to join the tables as noted. After joining the tables, a number of sample records is selected (e.g., 1000) for the remaining un-mapped columns and each column therein is looped through to compare the data with each other remaining column allowing the system to map the columns together which have the higher percentage of matching data. Accuracy can then be reported as the match % of the data comparison. Systems and methods can provide a row-by-row comparison of records and calculate variance and/or match percentages and generate with that information. In various embodiments, Match % can equal (Number of matched records/Total Number of records after joining tables)*100 and Variance % can equal (Number of unmatched records/Total Number of records after joining tables)*100.

A user can also profile joined results which allows for the profiling of two tables at once. This feature can be useful to identify issues in case of any data discrepancy. For example, a user can quickly profile a gender column for both tables for more detailed analysis of why the data in those columns may not be matching. In some embodiments, a lazy evaluation method can be used without requiring the exporting of data into the application server for calculating statistics. Accordingly, memory and processing power of the server can be saved while allowing for millions of records to be profiled and compared in few seconds based on the tech stack implementation described herein.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

EXAMPLES

Example 1—Database Metadata Interpretation

Prompt: Pythia, CTG refers to the Fidelity Corporate Technology Group, and ITEC is the old abbreviation for the Product Area now known as CAEC, and TMDL stands for the Technology Management Data Lake Query: please explain the meaning of the database name 'CTG_ITEC_TMDL_PRD LLM response: CTG_ITEC_TMDL_PRD is a database name used by the Fidelity Corporate Technology Group at Fidelity Investments. The database contains information about the IT systems and processes used by the company, including the technologies used, their performance, and any issues or problems that may arise. The database is used to manage the IT infrastructure and ensure that it is functioning properly, and is used to help Fidelity identify areas for improvement and make data-driven decisions to optimize the company's IT operations.

Example 2—Demonstration of Column Description with Data

Prompt: Pythia, CTG refers to the Fidelity Corporate Technology Group, and ITEC is the old abbreviation for the Product Area now known as CAEC, and TMDL stands for the Technology Management Data Lake Query: please explain the meaning of the column name 'ENVIRONMENT_NAME', which has as its top five values 'ALL', 'PRD', 'DEV', 'QA' and 'SND', which is a column in the table named 'CLOUD_CPU_UTILIZATION_MONTHLY', which is in the schema TMDL_CLOUDCOST_CURATED_C that is within database CTG_ITEC_TMDL_PRD LLM response: The ENVIRONMENT_NAME column in the Cloud CPU Utilization Monthly table in the TMDL_CLOUDCOST_CURATED_C schema of the CTG_ITEC_TMDL_PRD database represents the environment name of the data. The top five values in the ENVIRONMENT_NAME column are 'ALL', 'PRD', 'DEV', 'QA', and 'SND', which correspond to the different environments in which the data was collected. The ENVIRONMENT_NAME column is used to distinguish between different environments and to ensure that the data is properly aligned with the relevant environments. For example, if the data was collected in a production environment, the ENVIRONMENT_NAME column would contain the value 'PRD', while if the data was collected in a development environment, the ENVIRONMENT_NAME column would contain the value 'DEV'.

What is claimed is:

1. A computerized method for electronic data comparison, the method comprising using a column mapping engine for:

comparing column names between a first electronic data table and a second electronic data table;

defining columns having 100% column name similarities between the first and second electronic data tables as matches;

applying a fuzzy string matching algorithm (token sort ratio) to any unmatched column names from the defining step to produce a similarity score for each pair of unmatched column names between the first and second electronic data tables;

classifying columns as matches when the similarity score for the pair of unmatched column names is above a selected threshold;

selecting a number of sample records from remaining columns in the first and second electronic data tables not matched in the defining or classifying steps;

comparing the sample records from each remaining column in the first electronic data table to the sample records from each remaining column in the second electronic data table to determine a data match score;

mapping remaining columns from the first electronic data table as matches to remaining columns from the second electronic data table based on highest data match score; and performing, with a data comparison engine, a row-by-row comparison of records between the matched columns in the first and second electronic data tables to determine a match percentage or variance percentage for each of the matched columns.

2. The computerized method of claim 1, further comprising generating a report comprising the column names and match or variance percentage for each of the matched columns.

3. The computerized method of claim 2, wherein the report further comprises a record match count for each of the matched columns.

4. The computerized method of claim 2, wherein the report further comprises a record difference count for each of the matched columns.

5. The computerized method of claim 1, wherein the selected threshold is 50% similarity.

6. The computerized method of claim 1, wherein the selected threshold is 60% similarity.

7. The computerized method of claim 1, wherein the selected threshold is 70% similarity.

8. The computerized method of claim 1, wherein the number of sample records is 500 or more.

9. The computerized method of claim 1, wherein the number of sample records is 1000 or more.

10. A computer system for electronic data comparison, the system comprising a processor in communication with a non-transient memory and operable to perform the steps of:

using a column mapping engine to:

compare column names between a first electronic data table and a second electronic data table;

defining columns having 100% column name similarities between the first and second electronic data tables as matches;

applying a fuzzy string matching algorithm (token sort ratio) to any unmatched column names from the defining step to produce a similarity score for each pair of unmatched column names between the first and second electronic data tables;

classifying columns as matches when the similarity score for the pair of unmatched column names is above a selected threshold;

selecting a number of sample records from remaining columns in the first and second electronic data tables not matched in the defining or classifying steps;

comparing the sample records from each remaining column in the first electronic data table to the sample records from each remaining column in the second electronic data table to determine a data match score;

mapping remaining columns from the first electronic data table as matches to remaining columns from the second electronic data table based on highest data match score; and performing, with a data comparison engine, a row-by-row comparison of records between the matched columns in the first and second electronic data tables to determine a match percentage or variance percentage for each of the matched columns.

11. The computer system of claim 10, further operable to generate a report comprising the column names and match or variance percentage for each of the matched columns.

12. The computer system of claim 11, wherein the report further comprises a record match count for each of the matched columns.

13. The computer system of claim 11, wherein the report further comprises a record difference count for each of the matched columns.

14. The computer system of claim 10, wherein the selected threshold is 50% similarity.

15. The computer system of claim 10, wherein the selected threshold is 60% similarity.

16. The computer system of claim 10, wherein the selected threshold is 70% similarity.

17. The computer system of claim 10, wherein the number of sample records is 500 or more.

18. The computer system of claim 10, wherein the number of sample records is 1000 or more.

* * * * *